US012682113B2

(12) United States Patent
Ward et al.

(10) Patent No.: US 12,682,113 B2
(45) Date of Patent: Jul. 14, 2026

(54) SYSTEMS, METHODS, AND APPARATUSES FOR GENERATING STRUCTURED DATA FROM UNSTRUCTURED DATA USING NATURAL LANGUAGE PROCESSING TO GENERATE A SECURE MEDICAL DASHBOARD

(71) Applicant: Premier Healthcare Solutions, Inc., Charlotte, NC (US)

(72) Inventors: Gregory D. Ward, Peachtree City, GA (US); John Arvin House, Kansas City, MO (US); James Benjamin Davis, Chicago, IL (US); Yosef M. Khan, Irving, TX (US); Tim Riddle, Charlotte, NC (US); Andrew Thomas Latterner, Evanston, IL (US)

(73) Assignee: PREMIER HEALTHCARE SOLUTIONS, INC., Charlotte, NC (US)

( * ) Notice: Subject to any disclaimer, the term of this patent is extended or adjusted under 35 U.S.C. 154(b) by 329 days.

(21) Appl. No.: 18/213,629

(22) Filed: Jun. 23, 2023

(65) Prior Publication Data

US 2023/0418981 A1 Dec. 28, 2023

Related U.S. Application Data

(60) Provisional application No. 63/355,084, filed on Jun. 23, 2022.

(51) Int. Cl.
*G06F 21/62* (2013.01)
*G06F 16/34* (2025.01)
(Continued)

(52) U.S. Cl.
CPC .......... *G06F 21/6254* (2013.01); *G06F 16/34* (2019.01); *G06F 40/205* (2020.01); *G06F 40/279* (2020.01); *G06F 40/40* (2020.01)

(58) Field of Classification Search
None
See application file for complete search history.

(56) References Cited

U.S. PATENT DOCUMENTS

| | | | |
|---|---|---|---|
| 11,862,305 B1 * | 1/2024 | Sethi | G06V 30/416 |
| 2014/0289001 A1 * | 9/2014 | Shelton | G06F 21/6254 |
| | | | 705/7.29 |

(Continued)

*Primary Examiner* — Daniel C Washburn
*Assistant Examiner* — Tyler Becker
(74) *Attorney, Agent, or Firm* — Moore & Van Allen PLLC

(57) ABSTRACT

Systems, apparatuses, and methods are described herein for generating structured data from unstructured data using natural language processing to generate a secure medical dashboard. The present invention is configured to identify at least one data input, wherein the at least one data input comprises unstructured data; apply at least one NLP pipeline to the at least one data input; parse the unstructured data to generate a parsed unstructured dataset; identify a medical relevance attribute; generate a structured document comprising the at least one term and associated medical relevance attribute; correlate the at least one term comprising the positive medical attribute to a medical entity title; generate a medical dashboard interface component comprising the at least one term comprising the positive medical attribute and the medical entity title; transmit the medical dashboard interface component to a user device; and generate a secure medical dashboard on the user device.

17 Claims, 15 Drawing Sheets

(51) Int. Cl.
G06F 40/205 (2020.01)
G06F 40/279 (2020.01)
G06F 40/40 (2020.01)

(56) References Cited

U.S. PATENT DOCUMENTS

| | | | |
|---|---|---|---|
| 2016/0210427 A1* | 7/2016 | Mynhier | G16H 10/60 |
| 2019/0130073 A1* | 5/2019 | Sun | G16H 10/60 |
| 2020/0176098 A1* | 6/2020 | Lucas | G06F 40/30 |
| 2020/0327964 A1* | 10/2020 | Zhang | G06F 40/295 |
| 2021/0248268 A1* | 8/2021 | Ardhanari | G06F 21/53 |
| 2022/0115100 A1* | 4/2022 | Barve | G16H 10/60 |
| 2022/0367054 A1* | 11/2022 | Gnanasambandam | G16H 50/70 |

* cited by examiner

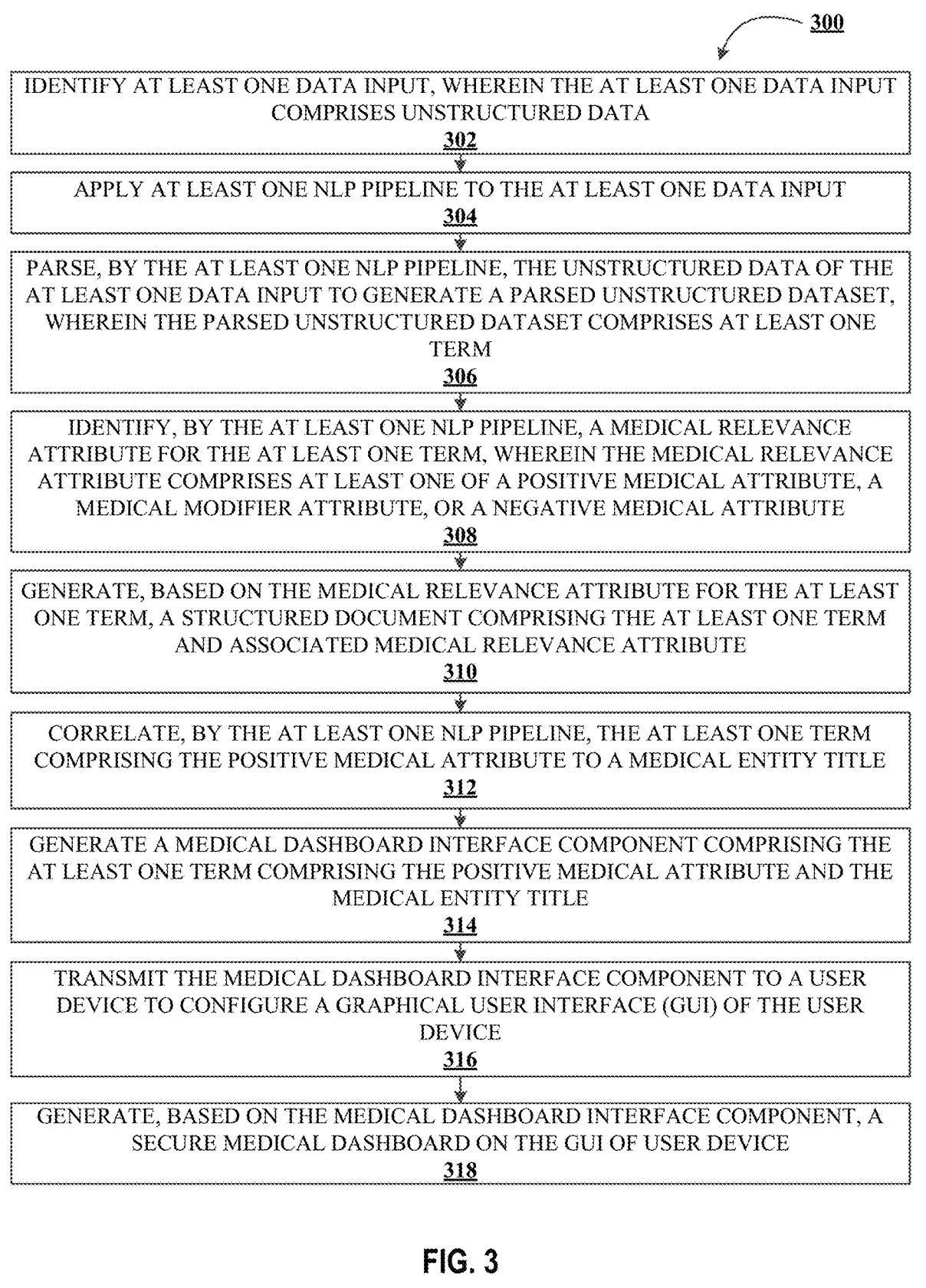

300

IDENTIFY AT LEAST ONE DATA INPUT, WHEREIN THE AT LEAST ONE DATA INPUT COMPRISES UNSTRUCTURED DATA
302

APPLY AT LEAST ONE NLP PIPELINE TO THE AT LEAST ONE DATA INPUT
304

PARSE, BY THE AT LEAST ONE NLP PIPELINE, THE UNSTRUCTURED DATA OF THE AT LEAST ONE DATA INPUT TO GENERATE A PARSED UNSTRUCTURED DATASET, WHEREIN THE PARSED UNSTRUCTURED DATASET COMPRISES AT LEAST ONE TERM
306

IDENTIFY, BY THE AT LEAST ONE NLP PIPELINE, A MEDICAL RELEVANCE ATTRIBUTE FOR THE AT LEAST ONE TERM, WHEREIN THE MEDICAL RELEVANCE ATTRIBUTE COMPRISES AT LEAST ONE OF A POSITIVE MEDICAL ATTRIBUTE, A MEDICAL MODIFIER ATTRIBUTE, OR A NEGATIVE MEDICAL ATTRIBUTE
308

GENERATE, BASED ON THE MEDICAL RELEVANCE ATTRIBUTE FOR THE AT LEAST ONE TERM, A STRUCTURED DOCUMENT COMPRISING THE AT LEAST ONE TERM AND ASSOCIATED MEDICAL RELEVANCE ATTRIBUTE
310

CORRELATE, BY THE AT LEAST ONE NLP PIPELINE, THE AT LEAST ONE TERM COMPRISING THE POSITIVE MEDICAL ATTRIBUTE TO A MEDICAL ENTITY TITLE
312

GENERATE A MEDICAL DASHBOARD INTERFACE COMPONENT COMPRISING THE AT LEAST ONE TERM COMPRISING THE POSITIVE MEDICAL ATTRIBUTE AND THE MEDICAL ENTITY TITLE
314

TRANSMIT THE MEDICAL DASHBOARD INTERFACE COMPONENT TO A USER DEVICE TO CONFIGURE A GRAPHICAL USER INTERFACE (GUI) OF THE USER DEVICE
316

GENERATE, BASED ON THE MEDICAL DASHBOARD INTERFACE COMPONENT, A SECURE MEDICAL DASHBOARD ON THE GUI OF USER DEVICE
318

FIG. 3

400

IDENTIFY AT LEAST ONE PREVIOUS UNSTRUCTURED DATASET, WHEREIN THE AT LEAST ONE PREVIOUS UNSTRUCTURED DATASET COMPRISES AN AT LEAST ONE PREVIOUS TERM
402

APPLY THE AT LEAST ONE NLP PIPELINE TO THE AT LEAST ONE PREVIOUS UNSTRUCTURED DATASET
404

DETERMINE, BY THE AT LEAST ONE NLP PIPELINE, THE MEDICAL RELEVANCE ATTRIBUTE FOR THE AT LEAST ONE PREVIOUS TERM
406

MAP, BY THE AT LEAST ONE NLP PIPELINE, THE AT LEAST ONE PREVIOUS TERM COMPRISING THE POSITIVE MEDICAL ATTRIBUTE TO THE MEDICAL ENTITY TITLE
408

COMPARE THE MEDICAL ENTITY TITLE FOR THE AT LEAST ONE PREVIOUS TERM TO A PRE-LABELED MEDICAL ENTITY TITLE FOR THE AT LEAST ONE PREVIOUS TERM
410

TRAIN THE AT LEAST ONE NLP PIPELINE BASED ON THE COMPARISON OF THE MEDICAL ENTITY TITLE FOR THE AT LEAST ONE PREVIOUS TERM TO THE PRE-LABELED MEDICAL ENTITY TITLE
412

COMPARE THE MEDICAL RELEVANCE ATTRIBUTE FOR THE AT LEAST ONE PREVIOUS TERM TO A PRE-LABELED MEDICAL RELEVANCE ATTRIBUTE FOR THE AT LEAST ONE PREVIOUS TERM
414

TRAIN THE AT LEAST ONE NLP PIPELINE BASED ON THE COMPARISON OF THE MEDICAL RELEVANCE ATTRIBUTE FOR THE AT LEAST ONE PREVIOUS TERM TO A PRE-LABELED MEDICAL RELEVANCE ATTRIBUTE
416

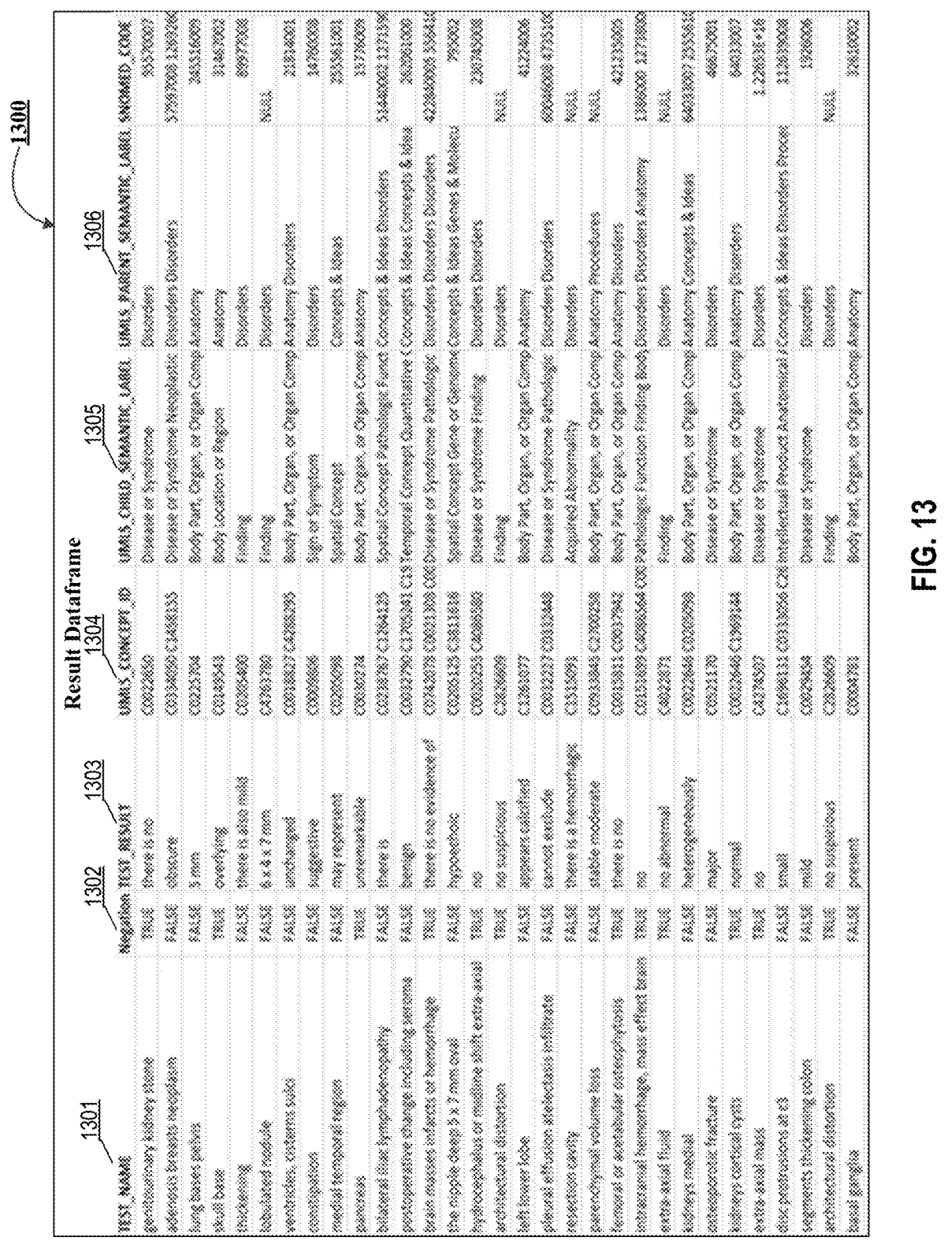

Result Dataframe

| TEST_NAME 1301 | Negation 1302 | TEST_RESULT 1303 | UMLS_CONCEPT_ID 1304 | UMLS_SEMANTIC_LABEL 1305 | UMLS_CHILD_SEMANTIC_LABEL | UMLS_PARENT_SEMANTIC_LABEL 1306 | STANDARD_CODE |
|---|---|---|---|---|---|---|---|
| genitourinary kidney stone | TRUE | there is no | C0022650 | Disease or Syndrome | | Disorders | 95570007 |
| adenexa breasts neoplasm | FALSE | obscure | C0346090 C1458333 | Disease or Syndrome Neoplastic Process | Disorders Disorders | | 57957005 115665001 |
| lung bases pelvis | FALSE | 5 mm | C0225706 | Body Part, Organ, or Organ Comp | Anatomy | | 361116005 |
| skull base | TRUE | overlying | C0043343 | Body Location or Region | Anatomy | | 31455002 |
| thickening | FALSE | there is slate mild | C0205400 | Entity | Disorders | | 69977006 |
| lobulated nodule | FALSE | 6 x 4 x 7 mm | C4293708 | Finding | Disorders | | |
| vertebralen systems sulci | FALSE | unchanged | C0205307 C4288093 | Body Part, Organ, or Organ Comp Anatomy | Disorders | | 256846001 |
| adaptation | FALSE | aggressive | C0086666 | Sign or Symptom | Disorders | | 1475001 |
| medial temporal region | FALSE | may represent | C0205095 | Special Concept | Concepts & Ideas | | 255051001 |
| posterior | TRUE | unremarkable | C0205094 | Body Part, Organ, or Organ Comp | Anatomy | | 15776009 |
| bilateral iliac lymphadenopathy | FALSE | there is | C0008784 C0024413 | Spatial Concept Pathologic Function | Concepts & Ideas Disorders | | 51440002 127119 |
| postoperative change including serous | TRUE | there is no evidence of | C0032790 C1704641 C3Temporal Concept Quantitative Concept Disease or Syndrome Pathology | Disorders Disorders Disorders | | 80004004 |
| brain masses infarcts or hemorrhage | FALSE | hypotrophic | C0743073 C0021308 C00 | Spatial Concept Gene or Genome Concepts & Ideas Concepts & Ideas | | Disorders Disorders Disorders | 42220002 433456 |
| the nipple deep 5 x 7 mm oval | TRUE | no | C0028190 C0028898 | Disease or Syndrome Finding | Disorders Disorders | | 79900 253569000 |
| hydrocephalus or midline shift extra axial | TRUE | no suppress | C0020255 | Finding | Disorders | | |
| architectural distortion | FALSE | appears distorted | C1963077 | Body Part, Organ, or Organ Comp | Anatomy | | 423225 |
| soft lower lobe | FALSE | cannot exclude | C0929988 | Disease or Syndrome | Disorders | | |
| pleural effusion appearance infiltrate | FALSE | there is hemorrhage | C0032227 C0332448 | Body Part, Organ, or Organ Comp | Anatomy | | 60046000 473538 |
| thickening cyst | FALSE | stable moderate | C0205091 | Acquired Abnormality | Disorders | | |
| dysplasia opacity | FALSE | there is no | C0013446 C2202203 | Body Part, Organ, or Organ Comp Anatomy Procedure | Disorders | | |
| parenchymal volume loss | TRUE | | C0563811 C0017842 | Body Part, Organ, or Organ Comp Anatomy Disorders | Disorders | | |
| femoral or acetabular ankylosytosis | TRUE | no | C0013399 C0085644 C00 Pathologic Function Finding Body Disorders Disorders Anatomy Finding | | Disorders Disorders | 42313006 127199 |
| intracranial hemorrhage mass effect brain | FALSE | no abnormal | C0022276 | Disease or Syndrome | Disorders | | 4865001 |
| extra axial fluid | TRUE | hemorrhagic opacity | C0085644 | Disease or Syndrome | Disorders | | 64313007 |
| axillary mass | FALSE | shape | C0011570 | Body Part, Organ, or Organ Comp | Anatomy | | |
| osteoporotic fracture | TRUE | mild | C0000644 | Body Part, Organ, or Organ Comp | Disorders | | 1.220059 *16 |
| solitary cerebral cysts | FALSE | small | C0006131 C0333006 C0 Intellectual Product Anatomical / Concepts & Ideas Disorders Process | | | 113419000 |
| extra axial mass | FALSE | mild | C0205434 | Disease or Syndrome | Disorders | | |
| disc protrusions at c3 | TRUE | no suspicious | C0028890 | Finding | Disorders | | 12500006 |
| segments thickening calor | FALSE | shape | C0004705 | Body Part, Organ, or Organ Comp Anatomy | | | |
| architectural distortion | TRUE | no appearance | | | | | |
| basal ganglia | FALSE | present | | | | | |

FIG. 13

SYSTEMS, METHODS, AND APPARATUSES FOR GENERATING STRUCTURED DATA FROM UNSTRUCTURED DATA USING NATURAL LANGUAGE PROCESSING TO GENERATE A SECURE MEDICAL DASHBOARD

CROSS-REFERENCE TO RELATED APPLICATIONS

This application claims the benefit of priority from U.S. Provisional Patent Application No. 63/355,084, filed on Jun. 23, 2022, the contents of which are hereby incorporated by reference in its entirety.

FIELD OF INVENTION

The present invention embraces a system for generating structured data from unstructured data using natural language processing to generate a secure medical dashboard.

BACKGROUND

There exists a great need in the medical field for properly tagging medical terms and semi-medically relevant terms in unstructured documents and generated structured documents from those tags. For instance, and where there is an abundance of patient records, patient reports (such as radiology reports for example), insurance reports, and/or the like, but where each of these documents must be manually read and tagged to make any sense of them and to generate different formats of the data based on different needs, there exists a great need for a system to automatically parse, understand, and generate attributes for later reformatting of the data based on a need (such as based on a trial provider's need to identify particular patients without violating patient confidentiality, the need for a hospital or provider to pick out particular patients, and/or the need for a system to aggregate and store all the patient data for both purposes).

Applicant has identified a number of deficiencies and problems associated with generating structured data from unstructured data using natural language processing to generate a secure medical dashboard. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for generating a secure medical dashboard using natural language processing (NLP) is provided. In some embodiments, the system may comprise at least one non-transitory storage device; at least one processor coupled to the at least one non-transitory storage device, wherein the processing device is configured to execute computer program code comprising computer instructions configured to cause said at least one processor to perform the following operations: identify at least one data input, wherein the at least one data input comprises unstructured data; apply at least one NLP pipeline to the at least one data input; parse, by the at least one NLP pipeline, the unstructured data of the at least one data input to generate a parsed unstructured dataset, wherein the parsed unstructured dataset comprises at least one term; identify, by the at least one NLP pipeline, a medical relevance attribute for the at least one term, wherein the medical relevance attribute comprises at least one of a positive medical attribute, a medical modifier attribute, or a negative medical attribute; generate, based on the medical relevance attribute for the at least one term, a structured document comprising the at least one term and associated medical relevance attribute; correlate, by the at least one NLP pipeline, the at least one term comprising the positive medical attribute to a medical entity title; generate a medical dashboard interface component comprising the at least one term comprising the positive medical attribute and the medical entity title; transmit the medical dashboard interface component to a user device to configure a graphical user interface of the user device; and generate, based on the medical dashboard interface component, a secure medical dashboard on the user device.

In some embodiments, the system may further comprise: identify at least one previous unstructured dataset, wherein the at least one previous unstructured dataset comprises an at least one previous term; apply the at least one NLP pipeline to the at least one previous unstructured dataset; determine, by the at least one NLP pipeline, the medical relevance attribute for the at least one previous term; map, by the at least one NLP pipeline, the at least one previous term comprising the positive medical attribute to the medical entity title; compare the medical entity title for the at least one previous term to a pre-labeled medical entity title for the at least one pervious term; and train the at least one NLP pipeline based on the comparison of the medical entity title for the at least one previous term to the pre-labeled medical entity title. In some embodiments, the system may further comprise: compare the medical relevance attribute for the at least one previous term to a pre-labeled medical relevance attribute for the at least one previous term; and train the at least one NLP pipeline based on the comparison of the medical relevance attribute for the at least one previous term to a pre-labeled medical relevance attribute. In some embodiments, the pre-labeled medical entity title for the at least one previous term comprises at least one of an expert label or a proficient label.

In some embodiments, the at least one data input comprises identified data or de-identified data.

In some embodiments, the at least one data input comprises a plurality of data inputs from a plurality of data sources.

In some embodiments, the system may further comprise: identify at least one patient attribute based on the at least one data input, wherein the at least one patient attribute is associated with a patient; receive an at least one inclusion requirement or at least one exclusion requirement, wherein the at least one inclusion requirement or the at least one exclusion requirement is associated with the at least one patient attribute; and compare the at least one patient attribute and the at least one inclusion requirement or the at least one exclusion requirement. In some embodiments, the at least one patient attribute comprises at least one of the medical entity title, a patient biological attribute, or a patient date. In some embodiments, the system may further comprise: generate a record identifier associated with the patient;

generate, based on the comparison of the at least one patient attribute, an applicability rating of the patient; and generate the medical dashboard interface component comprising the at least one term comprising the positive medical attribute, the record identifier, the applicability rating, the at least one patient attribute, and the at least one inclusion requirement or at least one exclusion requirement.

In some embodiments, the system may further comprise: generate a provider identifier associated with the patient; determine, based on the provider identifier, a plurality of patient attributes associated with a plurality of current patients, wherein the plurality of current patients are associated with a provider of the provider identifier; receive the at least one inclusion requirement or the at least one exclusion requirement, wherein the at least one inclusion requirement or the at least one exclusion requirement is associated with at least one patient attribute of the plurality of patient attributes; generate, based on the plurality of patient attributes associated with the plurality of current patients, a provider index for the provider identifier; and generate the medical dashboard interface component comprising the at least one inclusion requirement or the at least one exclusion requirement, the provider identifier, and the provider index. In some embodiments, the provider index comprises a dynamic patient total for the at least one inclusion requirement or the at least one exclusion requirement, wherein the dynamic patient total is based on the plurality of patient attributes compared to the at least one inclusion requirement or the at least one exclusion requirement.

In another aspect, a computer program product for generating a secure medical dashboard using natural language processing (NLP) is provided. In some embodiments, the computer program product may comprise at least one non-transitory computer-readable medium having computer-readable program code portions embodied therein, the computer-readable program code portions which when executed by a processing device are configured to cause the processor to: identify at least one data input, wherein the at least one data input comprises unstructured data; apply at least one NLP pipeline to the at least one data input; parse, by the at least one NLP pipeline, the unstructured data of the at least one data input to generate a parsed unstructured dataset, wherein the parsed unstructured dataset comprises at least one term; identify, by the at least one NLP pipeline, a medical relevance attribute for the at least one term, wherein the medical relevance attribute comprises at least one of a positive medical attribute, a medical modifier attribute, or a negative medical attribute; generate, based on the medical relevance attribute for the at least one term, a structured document comprising the at least one term and associated medical relevance attribute; correlate, by the at least one NLP pipeline, the at least one term comprising the positive medical attribute to a medical entity title; generate a medical dashboard interface component comprising the at least one term comprising the positive medical attribute and the medical entity title; transmit the medical dashboard interface component to a user device to configure a graphical user interface of the user device; and generate, based on the medical dashboard interface component, a secure medical dashboard on the user device.

In some embodiments, the processing device is configured to cause the processor to: identify at least one previous unstructured dataset, wherein the at least one previous unstructured dataset comprises an at least one previous term; apply the at least one NLP pipeline to the at least one previous unstructured dataset; determine, by the at least one NLP pipeline, the medical relevance attribute for the at least one previous term; map, by the at least one NLP pipeline, the at least one previous term comprising the positive medical attribute to the medical entity title; compare the medical entity title for the at least one previous term to a pre-labeled medical entity title for the at least one pervious term; and train the at least one NLP pipeline based on the comparison of the medical entity title for the at least one previous term to the pre-labeled medical entity title.

In some embodiments, the processing device is configured to cause the processor to: identify at least one patient attribute based on the at least one data input, wherein the at least one patient attribute is associated with a patient; receive an at least one inclusion requirement or an at least one exclusion requirement, wherein the at least one inclusion requirement or the at least one exclusion requirement is associated with the at least one patient attribute; and compare the at least one patient attribute and the at least one inclusion requirement or the at least one exclusion requirement. In some embodiments, the processing device is configured to cause the processor to: generate a record identifier associated with the patient; generate, based on the comparison of the at least one patient attribute, an applicability rating of the patient; and generate the medical dashboard interface component comprising the at least one term comprising the positive medical attribute, the record identifier, the applicability rating, the at least one patient attribute, and the at least one inclusion requirement or the at least one exclusion requirement.

In some embodiments, the processing device is configured to cause the processor to: generate a provider identifier associated with the patient; determine, based on the provider identifier, a plurality of patient attributes associated with a plurality of current patients, wherein the plurality of current patients are associated with a provider of the provider identifier; receive an at least one inclusion requirement or an at least one exclusion requirement, wherein the at least one inclusion requirement or the at least one exclusion requirement is associated with at least one patient attribute of the plurality of patient attributes; generate, based on the plurality of patient attributes associated with the plurality of current patients, a provider index for the provider identifier; and generate the medical dashboard interface component comprising the at least one inclusion requirement or the at least one exclusion requirement, the provider identifier, and the provider index.

In another aspect, a computer-implemented method for generating a secure medical dashboard using natural language processing (NLP) is provided. In some embodiments, the computer-implemented method may comprise: identifying at least one data input, wherein the at least one data input comprises unstructured data; applying at least one NLP pipeline to the at least one data input; parsing, by the at least one NLP pipeline, the unstructured data of the at least one data input to generate a parsed unstructured dataset, wherein the parsed unstructured dataset comprises at least one term; identifying, by the at least one NLP pipeline, a medical relevance attribute for the at least one term, wherein the medical relevance attribute comprises at least one of a positive medical attribute, a medical modifier attribute, or a negative medical attribute; generating, based on the medical relevance attribute for the at least one term, a structured document comprising the at least one term and associated medical relevance attribute; correlating, by the at least one NLP pipeline, the at least one term comprising the positive medical attribute to a medical entity title; generating a medical dashboard interface component comprising the at least one term comprising the positive medical attribute and least one term comprising the positive medical attribute and the medical entity title; transmitting the medical dashboard interface component to a user device to configure a graphical user interface of the user device; and generating, based on the medical dashboard interface component, a secure medical dashboard on the user device.

In some embodiments, the computer-implemented method may further comprise: identifying at least one previous unstructured dataset, wherein the at least one previous unstructured dataset comprises an at least one previous term; applying the at least one NLP pipeline to the at least one previous unstructured dataset; determining, by the at least one NLP pipeline, the medical relevance attribute for the at least one previous term; mapping, by the at least one NLP pipeline, the at least one previous term comprising the positive medical attribute to the medical entity title; comparing the medical entity title for the at least one previous term to a pre-labeled medical entity title for the at least one pervious term; and training the at least one NLP pipeline based on the comparison of the medical entity title for the at least one previous term to the pre-labeled medical entity title.

In some embodiments, the computer-implemented method may further comprise: identifying at least one patient attribute based on the at least one data input, wherein the at least one patient attribute is associated with a patient; receiving an at least one inclusion requirement or an at least one exclusion requirement, wherein the at least one inclusion requirement or the at least one exclusion requirement is associated with the at least one patient attribute; and comparing the at least one patient attribute and the at least one inclusion requirement or the at least one exclusion requirement. In some embodiments, the computer-implemented method may further comprise: generating a provider identifier associated with the patient; determining, based on the provider identifier, a plurality of patient attributes associated with a plurality of current patients, wherein the plurality of current patients are associated with a provider of the provider identifier; receiving an at least one inclusion requirement or an at least one exclusion requirement, wherein the at least one inclusion requirement or the at least one exclusion requirement is associated with at least one patient attribute of the plurality of patient attributes; generating, based on the plurality of patient attributes associated with the plurality of current patients, a provider index for the provider identifier; and generating the medical dashboard interface component comprising the at least one inclusion requirement or the at least one exclusion requirement, the provider identifier, and the provider index.

As will be understood by one of ordinary skill in the art, the above-recited features may also be implemented at least by a computer-implemented method, a computer-program product, and/or the like.

BRIEF DESCRIPTION OF THE DRAWINGS

Figure 1A:
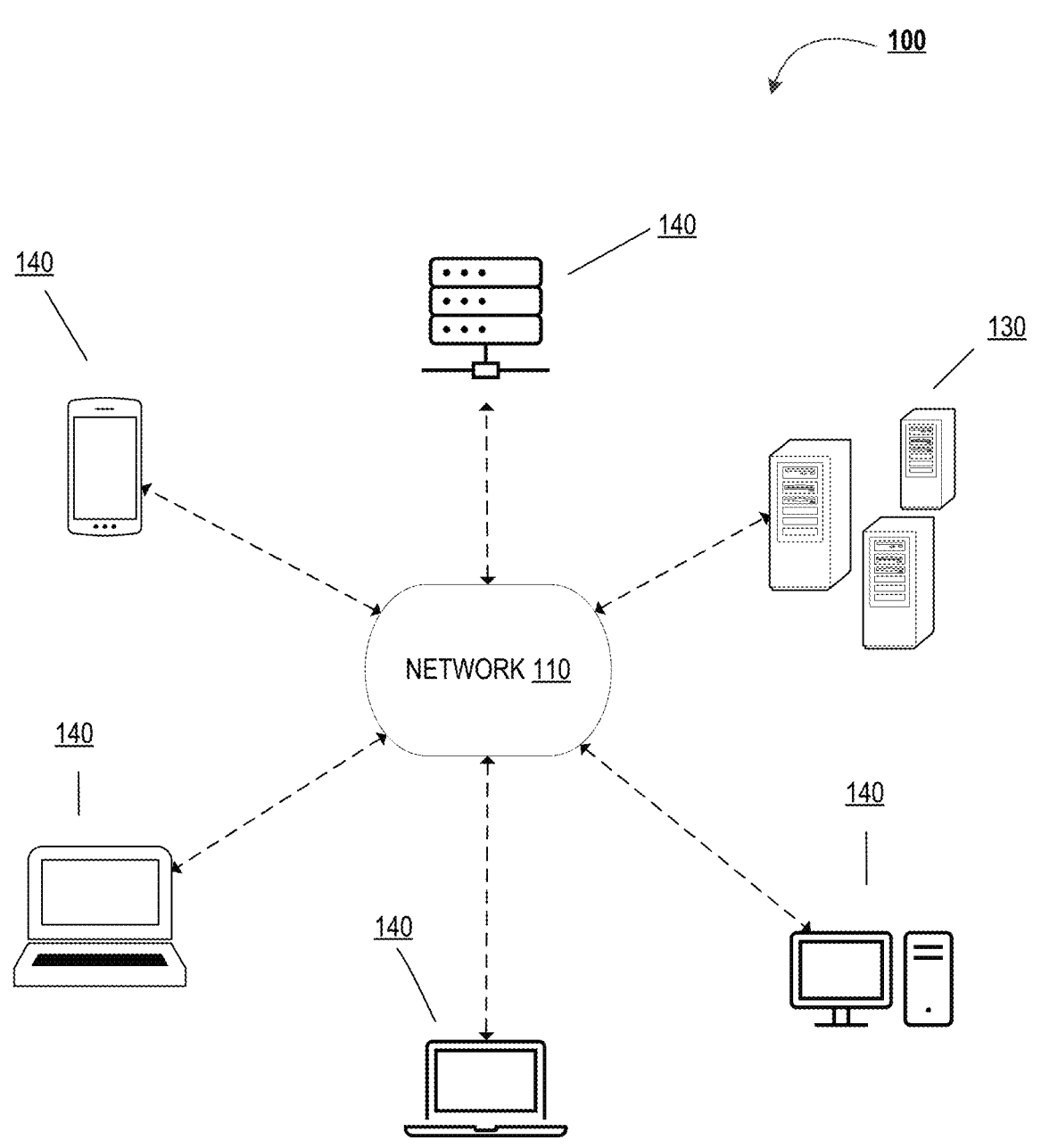
Figure 1B:
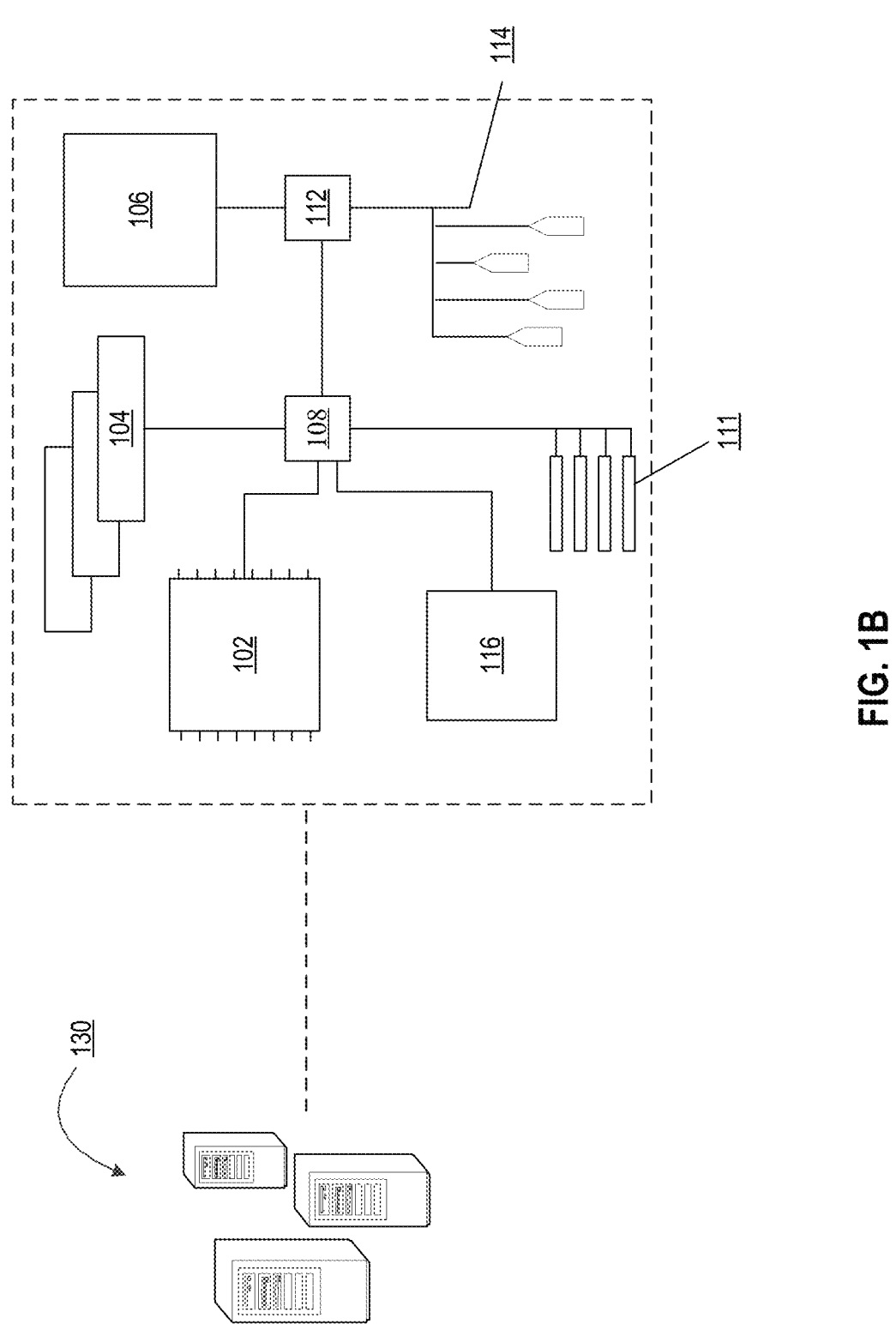
Figure 1C:
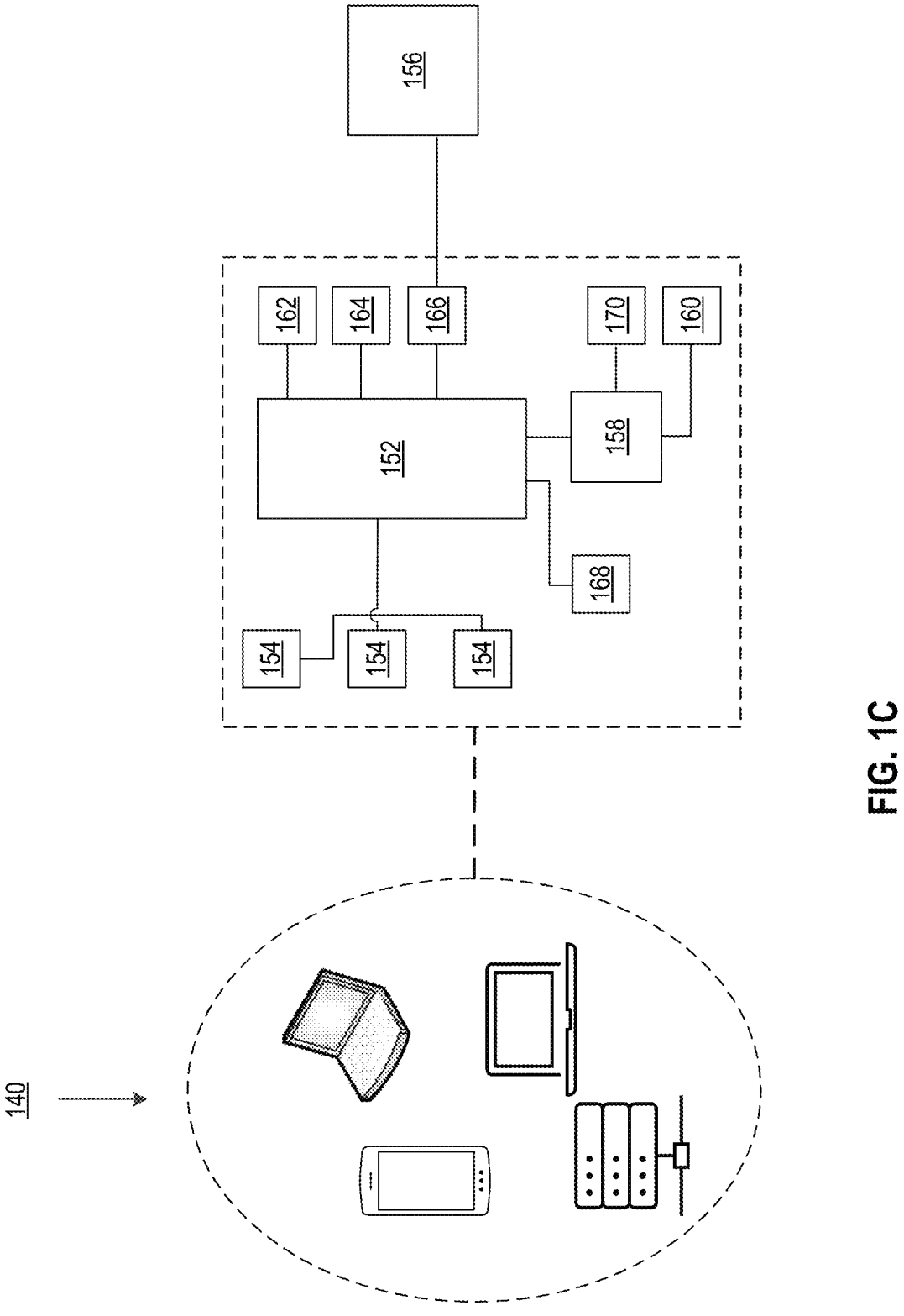
Figure 2:
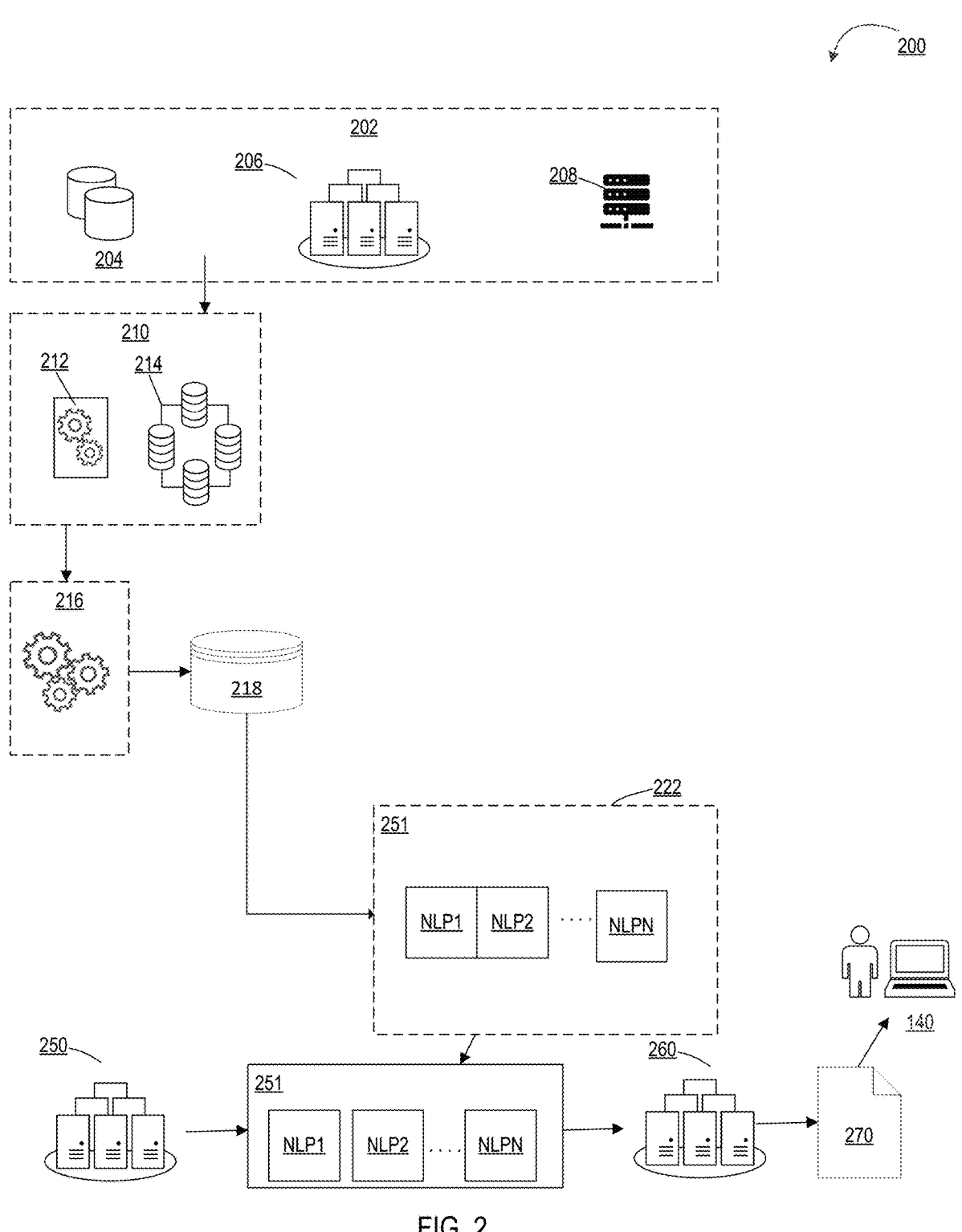
Figure 5:
Figure 6:
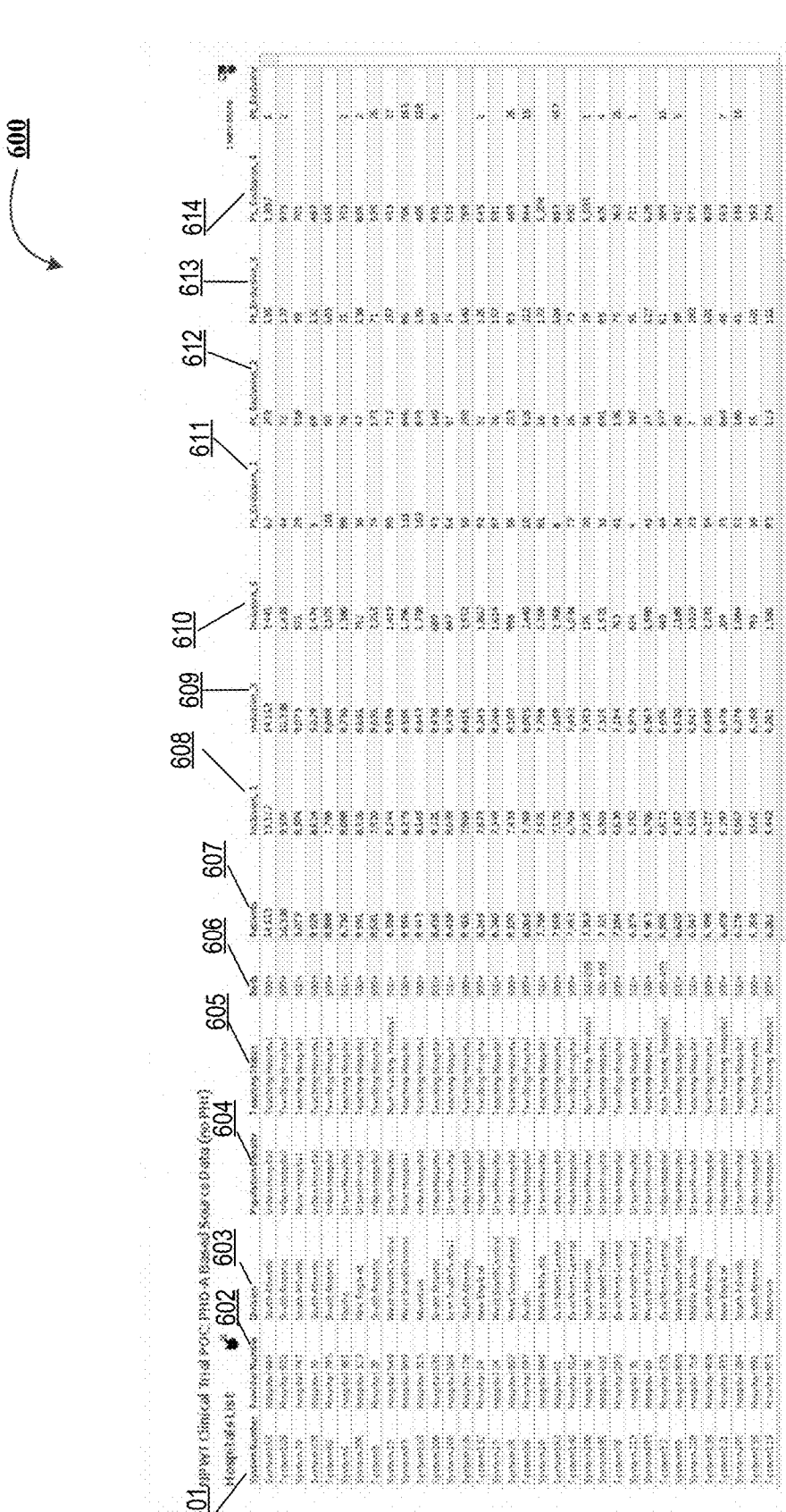
Figure 7:
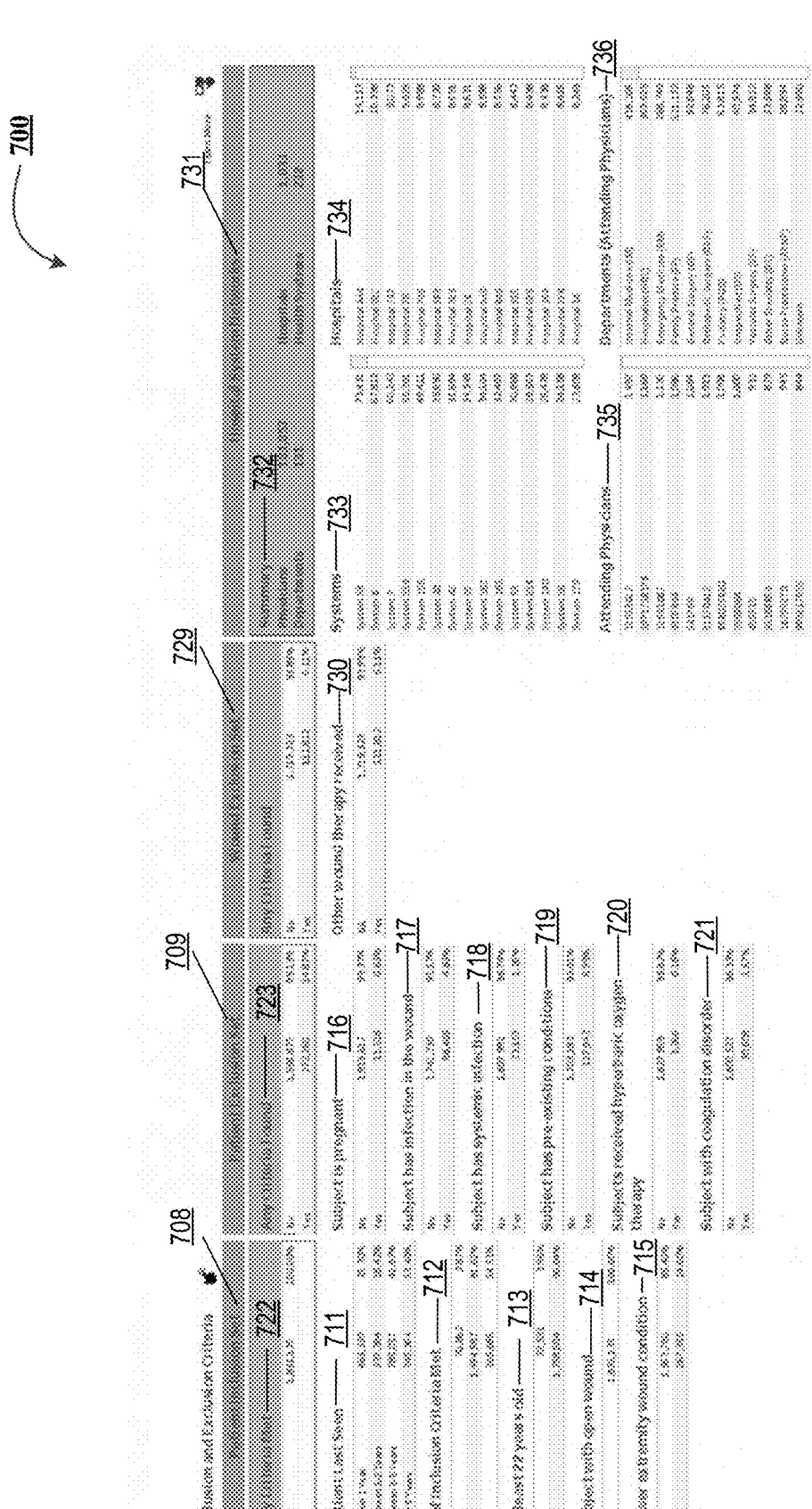
Figure 8:
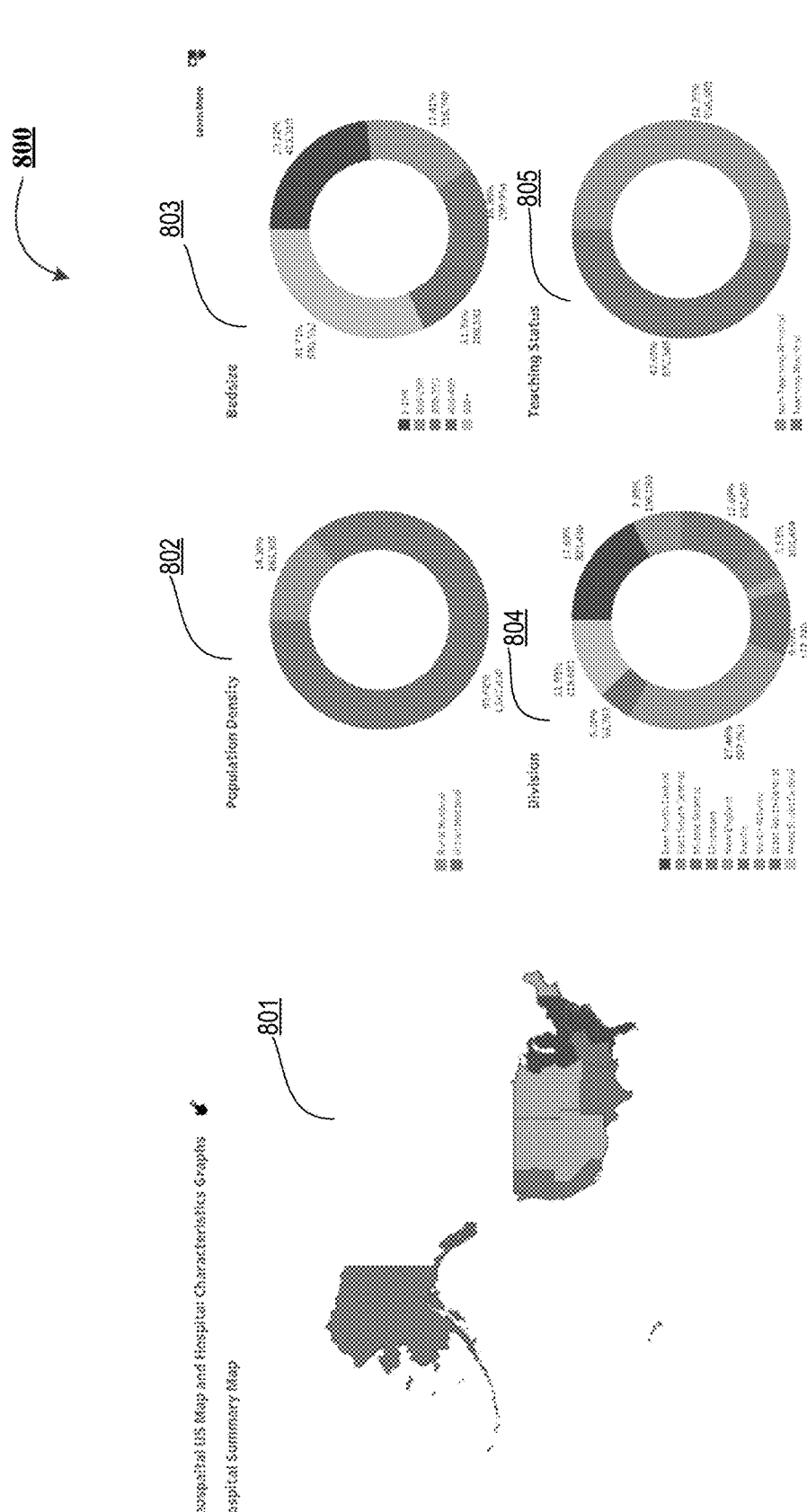
Figure 9:
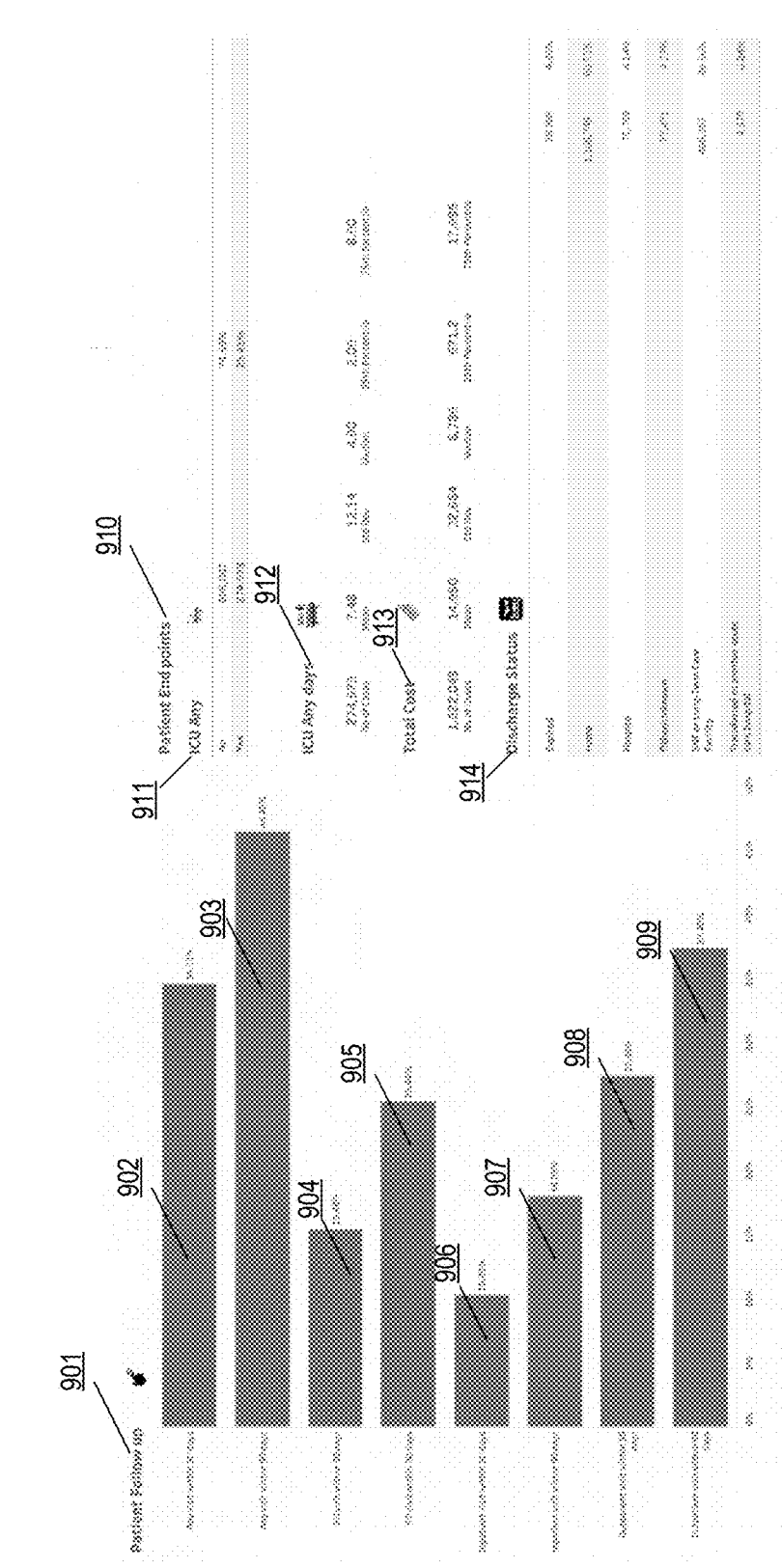
Figure 10:
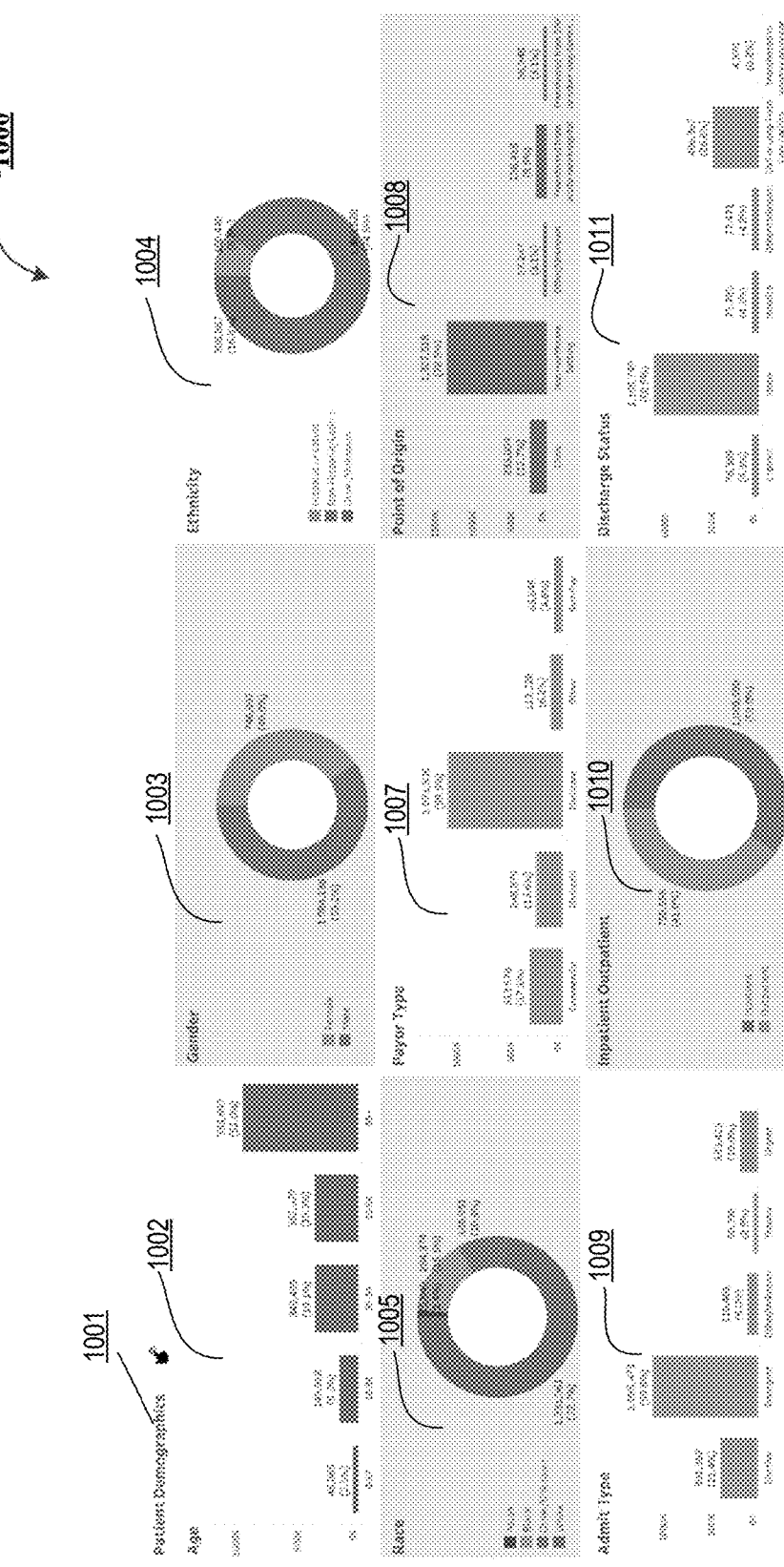
Figure 11:
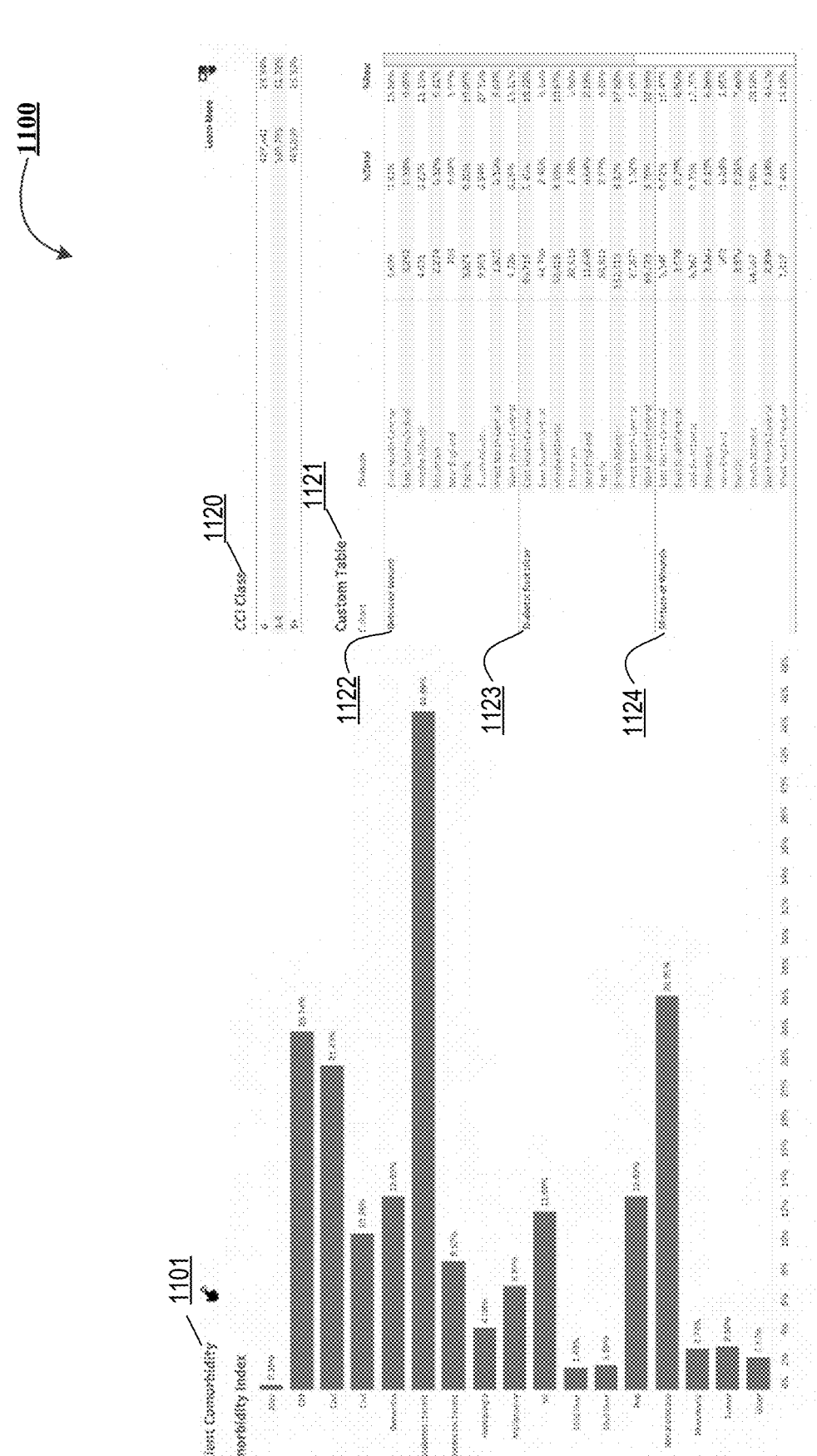
Figure 12:
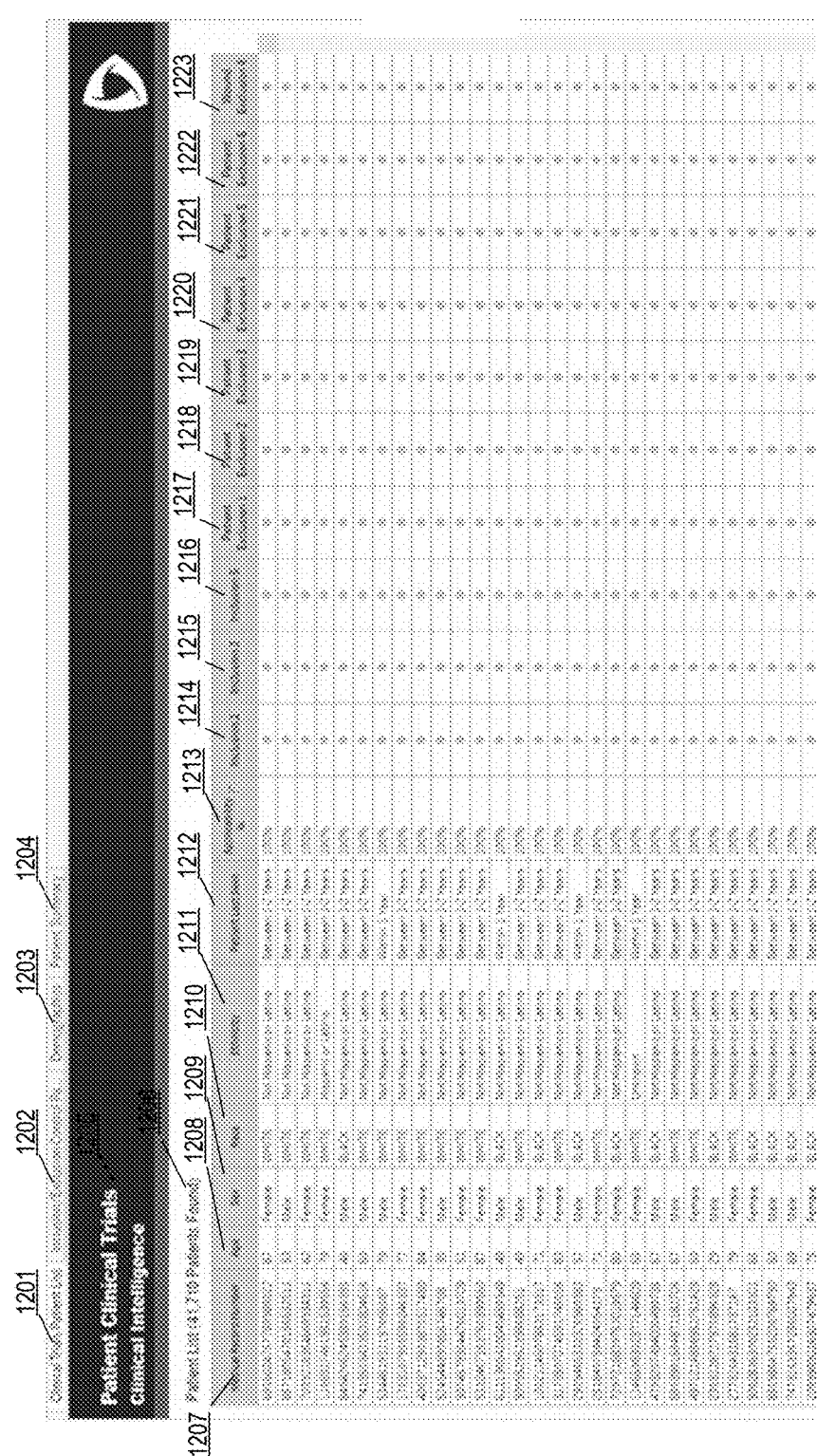

Having thus described embodiments of the invention in general terms, reference will now be made to the accompanying drawings, wherein:

FIGS. 1A-1C illustrates technical components of an exemplary distributed computing environment for generating structured data from unstructured data using natural language processing to generate a secure medical dashboard, in accordance with an embodiment of the disclosure;

FIG. 2 illustrates an exemplary natural language processing (NLP) subsystem architecture 200, in accordance with an embodiment of the disclosure;

FIG. 3 illustrates a process flow for generating structured data from unstructured data using natural language processing to generate a secure medical dashboard, in accordance with an embodiment of the disclosure;

FIG. 4 illustrates a process flow for training the at least one NLP pipeline, in accordance with an embodiment of the disclosure;

FIG. 5 illustrates a process flow for generating the secure medical dashboard based on at least one of a provider identifier or a record identifier, in accordance with an embodiment of the disclosure;

FIG. 6 illustrates an exemplary secure medical dashboard on a graphical user interface (GUI) of a user device, in accordance with an embodiment of the disclosure;

FIG. 7 illustrates an exemplary secure medical dashboard on a GUI of a user device, further comprising potential inclusion and exclusion requirements, in accordance with an embodiment of the disclosure;

FIG. 8 illustrates an exemplary secure medical dashboard on a GUI of a user device, further comprising patient attributes, provider attributes from a provider index, and a geographic graphic, in accordance with an embodiment of the disclosure;

FIG. 9 illustrates an exemplary secure medical dashboard on a GUI of a user device, further comprising patient attributes in an exemplary bar graph, in accordance with an embodiment of the disclosure;

FIG. 10 illustrates an exemplary secure medical dashboard on a GUI of a user device, further comprising patent attributes in exemplary bar graphs and pie charts, in accordance with an embodiment of the disclosure;

FIG. 11 illustrates an exemplary secure medical dashboard on a GUI of a user device, further comprising patent attributes in an exemplary bar graph and an index of patient attributes as related to geographic identifiers, in accordance with an embodiment of the disclosure;

FIG. 12 illustrates an exemplary secure medical dashboard on a GUI of a user device, further comprising record identifiers for a patient and patient attributes, in accordance with an embodiment of the disclosure; and FIG. 13 illustrates an exemplary secure medical dashboard on a GUI of a user device, further comprising medical entity titles, medical modifier attributes and terms, and unified medical language system (UMLS) identifiers, in accordance with an embodiment of the disclosure.

DETAILED DESCRIPTION OF EMBODIMENTS OF THE INVENTION

Embodiments of the present invention will now be described more fully hereinafter, with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As detailed above, there exists a great need in the medical field for properly tagging medical terms and semi-medically relevant terms in unstructured documents and generated structured documents from those tags. For instance, and where there is an abundance of patient records, patient reports (such as radiology reports for example), insurance reports, and/or the like, but where each of these documents must be manually read and tagged to make any sense of them and to generate different formats of the data based on different needs, there exists a great need for a system to automatically parse, understand, and generate attributes for later reformatting of the data based on a need (such as based on a trial provider's need to identify particular patients without violating patient confidentiality, the need for a hospital or provider to pick out particular patients, and/or the need for a system to aggregate and store all the patient data for both purposes). Such a reformatting of the data must occur such that the patient data is kept secure, up-to-date, and holistic for each of the needs identified by the secure medical dashboard system.

For example, trial providers, such as medical trial providers, may wish to identify what potential hospitals or potential patients meet certain medical trail requirements without violating security protocols of patient data, such as those security protocols defined by medical acts like HIPPA. For instance, a medical trial provider may wish to identify what hospitals (i.e., medical providers) may have a likelihood of success for certain trials, and whether each of these medical providers can qualify for such medical trials based on patient data of patients that have already visited the medical providers all while upholding the medical provider's duty to secure patient data. Current systems fail to accurately, securely, and efficiently analyze and provide this data to trial providers in a secure manner, such that patient data remains confidential.

Accordingly, the system described herein (i.e., the secure medical dashboard system) acts by identifying at least one data input, wherein the at least one data input comprises unstructured data (e.g., medical records, radiology records, insurance records, and/or the like); applying at least one NLP pipeline to the at least one data input; parsing, by the at least one NLP pipeline, the unstructured data of the at least one data input to generate a parsed unstructured dataset, wherein the parsed unstructured dataset comprises at least one term (e.g., a word, a number, a sequence of numbers, a phrase, and/or the like); and identifying, by the at least one NLP pipeline, a medical relevance attribute for the at least one term, wherein the medical relevance attribute comprises at least one of a positive medical attribute (i.e., term comprises medical relevance and is likely a diagnosis, disease, test, and/or the like), a medical modifier attribute (i.e., comprises some medical relevance as it modifies the positive medical attribute term), or a negative medical attribute (i.e. comprising no medical relevance). The secure medical dashboard may further act by generating, based on the medical relevance attribute for the at least one term, a structured document comprising the at least one term and associated medical relevance attribute; correlating, by the at least one NLP pipeline, the at least one term comprising the positive medical attribute to a medical entity title (e.g., a proper medical term which is associated with a medical term database, such as the unified medical language system (UMLS)); generate a medical dashboard interface component comprising the at least one term comprising the positive medical attribute and the medical entity title; transmit the medical dashboard interface component to a user device to configure a graphical user interface of the user device; and generate, based on the medical dashboard interface component, a secure medical dashboard on the user device (e.g., like that shown in FIGS. 6-12).

What is more, the present invention provides a technical solution to a technical problem. As described herein, the technical problem includes the generate of a secure medical dashboard that dynamically changes based on the needs of the requestor and which comprises data from at least one unstructured document. The technical solution presented herein allows for the accurate, efficient, and secure generation of the secure medical dashboard based on parsing, generating of medical relevance attributes for terms within an unstructured document (e.g., a medical unstructured document), determining medical entity titles (medical terms, including diagnoses, diseases, tests, and/or the like), and generating of a structured document from the unstructured document (comprising the medically relevant terms organized in a particular manner necessary for the needs of the viewer/requester). In particular, the secure medical dashboard system is an improvement over existing solutions to the medical dashboard generation, (i) with fewer steps to achieve the solution, thus reducing the amount of computing resources, such as processing resources, storage resources, network resources, and/or the like, that are being used (by using an NLP pipeline, less manual input is needed for individual tagging and generating of medical relevance attributes and generating of structured documents from that unstructured data); (ii) providing a more accurate solution to problem, thus reducing the number of resources required to remedy any errors made due to a less accurate solution (e.g., by dynamically changing which data is available to a requesting user (such as a trial provider, a hospital, and/or the like) the secure medical dashboard system allows for greater accuracy in data security and by using at least one NLP pipeline for accurate generation of the medical relevance attributes); (iii) removing manual input and waste from the implementation of the solution, thus improving speed and efficiency of the process and conserving computing resources (e.g., by using a pre-trained at least one NLP pipeline to automatically generate the medical relevance attributes for each term in the unstructured document and for all the unstructured documents received); (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment generating structured data from unstructured data using natural language processing to generate a secure medical dashboard 100, in accordance with an embodiment of the invention. As shown in FIG. 1A, the distributed computing environment 100 contemplated herein may include a system 130, a client device(s) 140, and a network 110 over which the system 130 and client device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the client device(s) 140 may have a client-server relationship in which the client device(s) 140 are remote devices that request and receive service from a centralized server, i.e., the system 130. In some other embodiments, the system 130 and the client device(s) 140 may have a peer-to-peer relationship in which the system 140 and the client device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The client device(s) 140 may represent various forms of electronic devices, including user input devices such as personal digital assistants, cellular telephones, smartphones, laptops, desktops, and other similar computing devices.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a selfcontained component of a larger system (e.g., system 130) and capable of being configured to execute specialized processes as part of the larger system.

The processor 102 can process instructions, such as instructions of an application that may perform the functions disclosed herein. These instructions may be stored in the memory 104 or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the client device(s) 140, in accordance with an embodiment of the invention. As shown in FIG. 1C, the client device(s) 140 includes a processor 152, memory 154, an input/output device such as a display 156, a communication interface 158, and a transceiver 160, among other components. The client device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the client device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the client device(s) 140, such as control of user interfaces, applications run by client device(s) 140, and wireless communication by client device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of client device(s) 140 with other devices. External interface 168 may provide, for example, for wired communication in some implementations, or for wireless communication in other implementations, and multiple interfaces may also be used.

The memory 154 stores information within the client device(s) 140. The memory 154 can be implemented as one or more of a computer-readable medium or media, a volatile memory unit or units, or a non-volatile memory unit or units. Expansion memory may also be provided and connected to client device(s) 140 through an expansion interface (not shown), which may include, for example, a SIMM (Single In Line Memory Module) card interface. Such expansion memory may provide extra storage space for client device(s) 140 or may also store applications or other information therein. In some embodiments, expansion memory may include instructions to carry out or supplement the processes described above and may include secure information also. For example, expansion memory may be provided as a security module for client device(s) 140 and may be programmed with instructions that permit secure use of client device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the client device(s) 140 to transmit and/or receive information or commands to and from the system 130 via the network 110. Any communication between the system 130 and the client device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the client device(s) 140 may provide the system 130 (or other client devices) permissioned access to the protected resources of the client device(s) 140, which may include a GPS device, an image capturing component (e.g., camera), a microphone, and/or a speaker.

The client device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to client device(s) 140, which may be used as appropriate by applications running thereon, and in some embodiments, one or more applications operating on the system 130.

The client device(s) 140 may also communicate audibly using audio codec 162, which may receive spoken information from a user and convert it to usable digital information. Audio codec 162 may likewise generate audible sound for a user, such as through a speaker, e.g., in a handset of client device(s) 140. Such sound may include sound from voice telephone calls, may include recorded sound (e.g., voice messages, music files, etc.) and may also include sound generated by one or more applications operating on the client device(s) 140, and in some embodiments, one or more applications operating on the system 130.

Various implementations of the distributed computing environment 100, including the system 130 and client device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary Natural Language Processing (NLP) subsystem architecture 200, in accordance with an embodiment of the invention. The NLP subsystem 200 may include a data acquisition engine 202, data ingestion engine 210, data pre-processing engine 216, NLP model tuning engine 222, inference engine 236, and NLP pipeline 251.

The data acquisition engine 202 may identify various internal and/or external data sources to generate, test, and/or integrate new features for training the NLP pipeline 251 (such as by gathering at least one unstructured datasets like that shown in as datasets 206). These internal and/or external data sources 204, 206, and 208 may be initial locations where the data originates or where physical information is first digitized (such as within a database, outside the secure medical dashboard system which receives the datasets from a medical provider's database or records, and/or the like). The data acquisition engine 202 may identify the location of the data and describe connection characteristics for access and retrieval of data.

In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, hospital management, patient records, insurance management and record-keeping, doctors' offices management and record-keeping, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. In some embodiments, and since the data comes from different places, it needs to be cleansed and transformed so that it can be analyzed together with data from other sources, such as to de-identify patient data. In some embodiments, some or all of the data may not be cleansed such that the patient data is not de-identified. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In natural language processing, the quality of data and the useful information that can be derived therefrom directly affects the ability of the natural language processing pipeline 251 and its components NLP1, NLP2, . . . NLPN. The data pre-processing engine 216 may implement advanced integration and processing steps needed to prepare the data for NLP execution. This may include modules to perform any upfront, data transformation to consolidate the data into alternate forms by changing the value, structure, or format of the data using generalization, weightage values, fuzzy the terms of the unstructured datasets, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. In some embodiments, the training data 218 may comprise pre-labeled medical relevance attributes and pre-labeled medical entity titles for the training unstructured datasets. Further, and in some embodiments, the training data 218 may be pre-labeled by users associated with the secure medical dashboard system such as experts and proficient users. Feature extraction and/or selection is a process of dimensionality reduction by which an initial set of data is reduced to more manageable groups for processing. In some embodiments, the training data 218 may require further enrichment. For example, in supervised learning, the training data is enriched using one or more meaningful and informative labels to provide context so the NLP pipeline 251 can learn from it. For example, labels might indicate whether a document and its associated terms comprise medically relevant data, medical modifier data, or non-medically relevant data. In contrast, unsupervised learning uses unlabeled data to find patterns in the data, such as inferences or clustering of data points.

An NLP pipeline tuning engine 222 may be used to train the NLP pipeline 251 using the training data 218 to make predictions or decisions without explicitly being programmed to do so. The NLP pipeline 251 represents what was learned by the selected machine learning algorithm 220 and represents the rules, numbers, and any other algorithm-specific data structures required for classification.

The NLP pipeline 251 contemplated, described, and/or used herein may include artificial intelligence, such as a Large Language Model (LLM), which may be trained on databases of medical records, databases of medical terms and/or unique medical identifiers (such as the medical identifiers within the UMLS), medical reports (such as radiology reports, doctors' reports, nurses' reports, medical insurance reports, and/or the like), and/or the like. In some such embodiments, the data used for training the LLM used by the NLP pipeline 251 may comprise unstructured and/or untagged data, such as data comprising letters, words, numbers, punctuation, and/or the like, which may be identified within the NLP pipeline 251 as comprising medically relevant information and/or non-medically relevant information (whereby such a process is described in further detail below). Additionally, and as used herein, the LLM may be trained with pre-tagged and/or structured data, which may be used by the LLM for future identification and organization of untagged data inputs. Additionally, and in some embodiments, the LLM may be trained with pre-set rules for the LLM, whereby such rules may be used to identify terms within the input data, patterns within the input data, rules for attributes of the data (which is described in more detail in FIG. 4), and/or the like.

In some embodiments, the NLP pipeline 251 may include machine learning supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the NLP pipeline 251, the NLP tuning engine 222 may repeatedly execute cycles of experimentation, testing, and tuning to optimize the performance of the NLP pipeline 251 and refine the results in preparation for deployment of those results for consumption or decision making. To this end, the NLP tuning engine 222 may dynamically vary hyperparameters each iteration (e.g., such as by a gradient of loss in calculating the gradient of weights for the NLP pipeline in more accurately determining future terms and their medical relevance attributes and medical entity titles), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained NLP pipeline 251 is one whose hyperparameters are tuned and accuracy maximized.

The trained NLP pipeline 251, similar to any other software application output, can be persisted to storage, file, memory, or application, or looped back into the processing component to be reprocessed. More often, the trained NLP pipeline 251 is deployed into an existing production environment to make accurate decisions on unstructured data based on live data 250 (e.g., unstructured datasets and input data). For instance, such an unstructured dataset/a plurality of future unstructured datasets 250 may be input to the training NLP pipeline 251 and analyzed by each of its NLP components (NLP1, NLP2, . . . NLPN) (which includes parsing the terms of the unstructured dataset(s) 250, fuzzy the terms of the unstructured dataset(s) 250, determining medical relevance attributes of each term for the unstructured dataset(s) 250, determining the medical entity title(s) of the terms where the terms comprise the positive medical relevance attribute, generating a structured dataset 260 of the terms with their medical relevance attributes and the medical entity titles (where applicable), and/or the like. Further, and based on the structured dataset 260 generated by the trained NLP pipeline 251, the secure medical dashboard system may generate the medical dashboard interface component 270 which may change based on where the medical dashboard interface component 270 is being transmitted to (e.g., which user device 140 is receiving the medical dashboard interface component 270).

It will be understood that the embodiment of the NLP subsystem 200 illustrated in FIG. 2 is exemplary and that other embodiments may vary. As another example, in some embodiments, the NLP subsystem 200 may include more, fewer, or different components.

FIG. 3 illustrates a process flow 300 for generating structured data from unstructured data using natural language processing to generate a secure medical dashboard, in accordance with an embodiment of the disclosure. In some embodiments, a system (e.g., similar to one or more of the systems described herein with respect to FIGS. 1A-1C and 2) may perform one or more of the steps of process flow 300. For example, a secure medical dashboard system (e.g., the system 130 described herein with respect to FIGS. 1A-1C and in combination with the NLP subsystem 200 of FIG. 2) may perform the steps of process flow 300.

As shown in block 302, the process flow 300 may include the step of identifying at least one data input, wherein the at least one data input comprises unstructured data. In some embodiments, the secure medical dashboard system may identify at least one data input, such as a received medical document (e.g., diagnosis report, hospital stay report, radiology report, doctor's office visit report, and/or the like), insurance document (e.g., insurance report, and/or the like), and/or the like, which comprises medical data. Such medical data within the at least one data input may comprise at least one of patient-identifying data (e.g., linked to a particular patient's identifier, such as a social security number, a patient's name, a patient's phone number, and/or the like) or non-identifying data (e.g., whereby the data is not linked to a particular patient's identifier, but instead linked to a provider's identifier, such as a hospital identifier where the patient has received medical care, a patient's primary care physician, a patient's attending physician(s), and/or the like). In some embodiments, the secure medical dashboard system may identify a plurality of data inputs, such that the secure medical dashboard system is configured to complete the process(es) described herein on each data input individually to generate the secure medical dashboard. In some embodiments and based on where the data input(s) are identified from and/or received from, the data input may comprise patient-identifying data or non-identifying data.

In some embodiments, the at least one data input (including the at least one unstructured dataset) may comprise a plurality of data inputs from a plurality of data sources, such as but not limited to medical insurance records, hospital records, doctor's office records, physician assistant's records, hospital system records, and/or the like. In some embodiments and based on the data source of the data input(s), the data input(s) may comprise at least one of identified data (patient-identifying data) and/or de-identified data (non-identifying patient data, such that the patient associated with the data cannot be identified).

As shown in block 304, the process flow 300 may include the step of applying at least one NLP pipeline to the at least one data input. In some embodiments, the secure medical dashboard system may apply at least one NLP pipeline to the identified at least one data input, whereby an NLP pipeline comprises a plurality of NLP components, in series, such that the at least one data input and its associated contents are fed through (i.e., input into each NLP component sequentially and synchronously from the previous NLP component). For instance, and in some embodiments, the secure medical dashboard system may input the at least one data input into an NLP pipeline comprising NLP components individually configured to parse the at least one data input, identify particular medical attributes based on the NLP component and its training and configurations, and/or the like.

In some embodiments, the NLP components within the NLP pipeline may be pre-trained using libraries, such as libraries comprising medical data, such as titles of medical diagnoses, medical diseases, medical tests, titles of medical symptoms (e.g., pain, swollen, itchy, rash, and/or the like), medical units (e.g., values and units for pharmaceutical drugs), medical modifiers (e.g., "the presence of," "there is no," "obscure," "overlying," "there is," "unremarkable," "no," and/or the like), UMLS (unified medical language system) identifiers associated with the medical tests, diseases, diagnoses, and/or the like. In some embodiments, the libraries may be publicly available, such as open source libraries. In some embodiments, the libraries may be privately generated and/or stored, such as privately generated by a client of the secure medical dashboard system, by an entity associated with the client of the secure medical dashboard system (e.g., an insurance company associated with the client of the secure medical dashboard system, a hospital associated with the client of the secure medical dashboard system, and/or the like), by a manager of the secure medical dashboard, and/or the like.

As shown in block 306, the process flow 300 may include the step of parsing—by the at least one NLP pipeline—the unstructured data of the at least one data input to generate a parsed unstructured dataset, wherein the parsed unstructured dataset comprises at least one term. In some embodiments, the secure medical dashboard system may parse (through the NLP pipeline and its NLP components) the at least one data input in order to individually analyze each of the terms, phrases, numerical values, strings of letters or words, and/or the like, from within the at least one data input. As used herein, terms may refer to strings of letters and numbers, such as words, numbers, sequences of numbers, punctuation, and/or the like. In some embodiments, the parsing of the at least one data input may comprise the disregard of punctuation such as periods, commas, and/or the like, such that the NLP pipeline's components are only concerned with analyzing the words, strings of words, numbers, strings of numbers, and/or the like, from the at least one data input.

As shown in block 308, the process flow 300 may include the step of identifying—by the at least one NLP pipeline—a medical relevance attribute for the at least one term, wherein the medical relevance attribute comprises at least one of a positive medical attribute, a medical modifier attribute, or a negative medical attribute. In some embodiments, the secure medical dashboard system may identify (using the NLP pipeline and its components) a medical relevance attribute for each of the terms within the at least one data input, whereby each term is associated with a medical relevance attribute identified or generated by the secure medical dashboard system to describe the term as compared to medically relevant information. For instance, each term may comprise a medical relevance attribute of a positive medical attribute (i.e., the term is medically relevant and the term is likely a diagnosis, a disease, a symptom, a medical test, and/or the like), a medical modifier attribute (i.e., the term is associated and closely related to a term comprising the positive medical attribute and modifies the information of the term comprising the positive medical attribute, such as a unit of pharmaceutical drug administered, a size of a rash, and/or the like), or a negative medical attribute (i.e., the term is neither a positive medical term or a medical modifier term and is likely extra terms not needed for the medical diagnosis or medical record of the patient).

As shown in block 310, the process flow 300 may include the step of generating, based on the medical relevance attribute for the at least one term, a structured document comprising the at least one term and associated medical relevance attribute. In some embodiments, the secure medical dashboard system may generate a structured document of the at least one data input, such that the structured document comprises the terms of the at least one data input and their associated medical relevance attributes. In this manner, the secure medical dashboard system may generate a new document comprising each of the original terms of the at least one data input and their associated medical relevance attributes which may be used by the secure medical dashboard system to extract the terms comprising the positive medical attribute and the medical modifier attribute and re-organize the terms and/or store these terms based on their medical relevance attributes and association with other terms for the patient identifier (or record identifier) and/or provider identifier.

In some embodiments, the generated structured may comprise the terms from a plurality of data inputs, whereby the terms are organized based on their medical relevance attributes and their association with a particular patient, a particular hospital, a particular system of hospitals, and/or the like. In this manner, the secure medical dashboard system may generate a structured document to comprise all the identified data from the secure medical dashboard system for each patient, for each hospital, for each hospital system, and/or the like, where the structured document is a summary of each of the medical tests, medical diseases, medical diagnoses, medical modifiers, and/or the like, administered for the patient, for the hospital, for the hospital system, respectively.

As shown in block 312, the process flow 300 may include the step of correlating, by the at least one NLP pipeline, the at least one term comprising the positive medical attribute to a medical entity title. In some embodiments, the secure medical dashboard system may correlate (using the at least one NLP pipeline and its components) the terms of the at least one data input (the terms comprising the positive medical attribute) to a medical entity title, such as an identified medical test, medical diagnosis, medical disease, medical anatomical region, and/or the like, from a pre-generated list of identified medical entity titles. In this manner, the terms comprising the positive medical attributes are correlated and/or mapped to their proper medical entity title (verified medical entity titles). As used herein, the medical entity term refers to a verified medical term such as a medical diagnosis, medical test, medical disease, anatomical region, medical symptom, and/or the like. Such medical entity titles are additionally associated with a universal identifier, such as a unified medical language system (UMLS) identifier.

In some embodiments, the secure medical dashboard system may additionally correlate the terms comprising medical modifier attributes to a medical entity title, such that the combination of the terms comprising the positive medical attributes and medical modifier attributes are used to identify the verified medical entity title for the terms within at least one data input.

As shown in block 314, the process flow 300 may include the step of generating a medical dashboard interface component comprising the at least one term comprising the positive medical attribute and the medical entity title. In some embodiments, the secure medical dashboard system may generate a medical dashboard interface component based on the medical entity title(s) identified for the at least one data input, based on the medical modifier attributes and associated terms, and based on the identifier of the patient (for patient-identifying data or non-identifying data as the at least one data input) or provider, and/or the like. In some embodiments, the medical dashboard interface component may comprise the data described herein, organized in a particular manner (such as a pie chart, bar graph, chart, and/or the like), as a data packet to be transmitted to a particular entity's user device and used to configure the graphical user interface (GUI) of the entity's user's device to show a secure medical dashboard comprising the data.

In some embodiments, and as described in further detail below, the medical dashboard interface component may change based on the user device the medical dashboard interface component is being transmitted to.

As shown in block 316, the process flow 300 may include the step of transmitting the medical dashboard interface component to a user device to configure a graphical user interface (GUI) of the user device. In some embodiments, the secure medical dashboard system may transmit the medical dashboard interface component to a requesting user device to configure the GUI of the user device to show the data of the medical dashboard interface component. By way of non-limiting example, a user device (such as a user device associated with a particular entity, like a trial provider, a medical provider like a hospital or hospital system, and/or the like) may submit a request to the secure medical dashboard system to access a particular hospital's data, a particular hospital system's data, a particular patient's data, and/or the like. Based on this request and based on the requesting user device associated with the particular entity, the secure medical dashboard system will generate the medical dashboard interface component with secure data associated with the request. Each of these medical dashboard interface components is described in further detail below.

As shown in block 318, the process flow 300 may include the step of generating, based on the medical dashboard interface component, a secure medical dashboard on the GUI of the user device. In some embodiments, the secure medical dashboard system may—after transmitting the medical dashboard interface component to the user device—cause the user device to configure its GUI to show a secure medical dashboard comprising the data of the medical dashboard interface component. Further, and where the medical dashboard interface component's data changes based on the requesting user device, the secure medical dashboard system may cause the user device's GUI to be configured to show the data of the medical dashboard interface component to show the secure data requested by the user device, which may change based on the entity associated with the requesting user device.

FIG. 4 illustrates a process flow 400 for training the at least one NLP pipeline, in accordance with an embodiment of the disclosure. In some embodiments, a system (e.g., similar to one or more of the systems described herein with respect to FIGS. 1A-1C and 2) may perform one or more of the steps of process flow 400. For example, a secure medical dashboard system (e.g., the system 130 described herein with respect to FIGS. 1A-1C and in combination with the NLP subsystem 200 of FIG. 2) may perform the steps of process flow 400.

In some embodiments, and as shown in block 402, the process flow 400 may include the step of identifying at least one previous unstructured dataset, wherein the at least one previous unstructured dataset comprises at least one previous term. By way of non-limiting example, the secure medical dashboard system may identify at least one previous unstructured dataset, whereby the at least one previous unstructured dataset comprises at least one term and/or a plurality of terms. The term(s) within the at least on previous unstructured dataset may comprise medical information, modifiers for the medical information, and/or non-medical information, which may be used by the secure medical dashboard system and the at least one NLP pipeline to train the at least one NLP pipeline.

As used herein, the unstructured dataset described herein, including the at least one previous unstructured dataset may comprise a plurality of unstructured data inputs (e.g., such as unstructured medical files, unstructured medical documents, and/or the like) which further comprises terms that have not yet been identified and structured based on the identified meaning for each term and whether the term is relevant to medical data. For instance, and by using the NLP pipeline, the secure medical dashboard system may identify whether each previous term of the at least one previous unstructured dataset should be associated with a positive medical attribute, a medical modifier attribute, and/or a negative medical attribute.

In some embodiments, and as shown in block 404, the process flow 400 may include the step of applying the at least one NLP pipeline to the at least one previous unstructured dataset. By way of non-limiting example, the secure medical dashboard system may apply the at least one NLP pipeline to the at least one previous unstructured dataset to train the at least one NLP pipeline.

In some embodiments, the at least one previous unstructured dataset may be pre-labeled with the medical relevance attributes such that the NLP pipeline may be trained using the pre-labeled relevance attributes and may identify rules for each previous term. In some embodiments, the pre-labeled medical relevance attributes of the at least one previous unstructured dataset may be used as a feedback mechanism for the at least one NLP pipeline, such that the at least one NLP pipeline may identify the medical relevance attributes for the term(s) of the at least one previous unstructured dataset and then compare the pre-labeled medical relevance attributes against the generated medical relevance attributes of the NLP pipeline and make adjustments to the NLP pipeline where necessary to become more accurate in determining the meaning of the previous term(s).

In some embodiments, and as shown in block 406, the process flow 400 may include the step of determining, by the at least one NLP pipeline, the medical relevance attribute for the at least one previous term. By way of non-limiting example, the secure medical dashboard system may deter-mine—using the at least one NLP pipeline applied to the at least one previous unstructured dataset—the medical rel-evance attributes for each previous term of the at least one previous unstructured dataset.

In some embodiments, and as shown in block 408, the process flow 400 may include the step of mapping, by the at least one NLP pipeline, the at least one previous term comprising the positive medical attribute to the medical entity title. By way of non-limiting example, the secure medical dashboard system may map and/or correlate—by the at least one NLP pipeline—the at least one previous term comprising the positive medical attribute to the proper medical entity title, whereby the medical entity title com-prises a unique identifier of at least one of a medical diagnosis, a medical test, a medical disease, an anatomical region, and/or the like.

In some embodiments, and as shown in block 410, the process flow 400 may include the step of comparing the medical entity title for the at least one previous term to a pre-labeled medical entity title for the at least one previous term. By way of non-limiting example, the at least one NLP pipeline may be trained by determining the medical entity title and comparing the determined medical entity title to a pre-labeled medical entity title. In this manner, the at least one NLP pipeline may be trained to determine the medical entity title and may readjust its determinations based on the comparison of the pre-labeled medical entity title to the determined medical entity title for the previous term(s) of the at least one previous unstructured dataset.

As used herein, the pre-labeled medical entity title may comprise at least one of a pre-labeling by an expert or a proficient user, whereby the expert labeler may then gener-ate the pre-labeled medical entity title as an expert label and whereby the proficient labeler may then generate the pre-labeled medical entity title as a proficient label. Further, and as used herein an expert labeler may comprise an expert within the medical field, such as a licensed doctor, a medical insurance provider, and/or the like. Additionally, and as used herein a proficient labeler may comprise a semi-expert in the medical field, such as a labeler that is not a licensed medical provider or insurance provider but is aware of each of the medical entity titles in a medical database, such as the UMLS.

In some embodiments, and as shown in block 412, the process flow 400 may include the step of training the at least one NLP pipeline based on the comparison of the medical entity title for the at least one previous term to the pre-labeled medical entity title. By way of non-limiting example, the secure medical dashboard system may train the at least one NLP pipeline based on comparison the deter-mined medical entity title(s) for the previous term(s) against the pre-labeled medical entity title(s) for the previous unstructured dataset. Based on this comparison and based on whether the determined medical entity title(s) match the pre-labeled medical entity title(s), the at least one NLP pipeline may be adjusted to better determine the medical entity titles for future unstructured dataset(s).

In some embodiments, and as shown in block 414, the process flow 400 may include the step of comparing the medical relevance attribute for the at least one previous term to a pre-labeled medical relevance attribute for the at least on previous term. For instance, the secure medical dashboard system may compare the medical relevance attribute for the at least one previous term to the pre-labeled medical rel-evance attribute in order to determine whether adjustments to the at least one NLP pipeline should be made by the secure medical dashboard system.

In some embodiments, and as shown in block 416, the process flow 400 may include the step of training the at least one NLP pipeline based on the comparison of the medical relevance attribute for the at least one previous term to a pre-labeled medical relevance attribute. By way of non-limiting example, the secure medical dashboard system may train the at least one NLP pipeline based on the comparison of the medical relevance attribute(s) for the previous term(s) of the at least one previous unstructured dataset against the pre-labeled medical relevance attribute(s) for the previous term(s). Further, and based on this comparison, the secure medical dashboard system may automatically adjust the at least one NLP pipeline and its decision-making in order for the at least one NLP pipeline to accurately determine the medical relevance attributes and the medical entity titles for future terms.

As used herein, the adjustment to the at least one NLP pipeline may comprise a gradient of loss determination, which further comprises the determination or generation of the gradient of weights for the NLP pipeline(s). Such a gradient of loss training and readjustment of the weights may be used to train the NLP pipeline(s) iteratively, until the NLP pipeline(s) are optimized and weighted in the right direction toward predicting the pre-labeled medical rel-evance attributes of the pre-labeled terms and the pre-labeled medical entity titles of the pre-labeled terms from the training dataset.

Further, and in some embodiments, the NLP pipeline(s) may additionally be trained based performance metrics as compared to a pre-defined performance threshold. For instance, such a pre-defined performance threshold may be pre-defined by a manager of the secure medical dashboard system, a client of the secure medical dashboard system, and/or the like. Such a performance threshold may comprise a percentage value (such as 85%, 90%, 95%, 99%, and/or the like) whereby the performance threshold may be used for an overall performance metric of the NLP pipeline as well as for each NLP pipeline component, individually.

In some embodiments, the performance metrics may comprise a precision metric (indicating a value of the predicted medical relevance attributes and/or medical entity titles that were correct for all the predicted medical rel-evance attributes and/or medical entity titles), a recall metric (indicating the number of times a prediction occurred as compared to the number of correct predictions made for the medical relevance attributes and/or medical entity titles), and an F-Score metric (indicating a mean of the precision metric and recall metric for each iteration of the NLP pipeline training). Such metrics may be used in training the at least one NLP pipeline to decrease the amount of trade-off between the precision metric and the recall metric for the at least one NLP pipeline, such that the at least one NLP pipeline will continue to predict the medical relevance attributes and/or medical entity titles with greater accuracy and efficiency. Further, and as described herein, the use of each of these metrics may additionally decrease the number of times the at least one NLP pipeline will generate false positives, false negatives, and to predict true positives at a greater accuracy.

FIG. 5 illustrates a process flow 500 for generating the secure medical dashboard based on at least one of a provider identifier or a record identifier, in accordance with an embodiment of the disclosure. In some embodiments, a system (e.g., similar to one or more of the systems described herein with respect to FIGS. 1A-1C and 2) may perform one or more of the steps of process flow 500. For example, a secure medical dashboard system (e.g., the system 130 described herein with respect to FIGS. 1A-1C and in combination with the NLP subsystem 200 of FIG. 2) may perform the steps of process flow 500.

In some embodiments, and as shown in block 502, the process flow 500 may include the step of identifying at least one patient attribute based on the at least one data input, wherein the at least one patient attribute is associated with a patient. By way of non-limiting example, the secure medical dashboard system may identify at least one patient attribute based on the at least one data input, whereby the at least one patient attribute comprises medical data for the patient, biological information for the patient (e.g., patient biological attribute(s) may comprise data regarding the patient's age, sex, race, ethnicity, and/or the like), geographic location for the patient, provider information for the patient (e.g., hospital where patient last visited or ever visited, physician, physician's assistant, date patient was last seen, and/or the like), and/or the like.

In some embodiments, and as shown in block 504, the process flow 500 may include the step of receiving an at least one inclusion requirement or at least one exclusion requirement, wherein the at least one inclusion requirement or the at least one exclusion requirement is associated with the at least one patient attribute. By way of non-limiting example, the secure medical dashboard system may receive, such as from a user device associated with a client of the secure medical dashboard system (like a trial provider), at least one of an inclusion requirement or an exclusion requirement (and/or a plurality of inclusion requirements and/or exclusion requirements). Such an inclusion requirement may comprise an attribute requested by the trial provider which the trial provider wishes a patient would have for a particular trial, and/or an exclusion requirement that comprises an attribute requested by the trial provider that the patient not have for a particular trial.

In some embodiments, the secure medical dashboard system may be configured to dynamically determine—based on the applicability of patients identified by the secure medical dashboard system—which inclusion requirement(s) and exclusion requirement(s) may be changed (gotten rid of, amended, and/or the like) to identify more patients that would fit the amended inclusion requirement(s) and/or exclusion requirement(s). In some embodiments and based on the amended inclusion requirement(s) and/or amended exclusion requirement(s), the secure medical dashboard system may update the medical dashboard interface component to comprise the newly amended inclusion requirement(s) and/or exclusion requirement(s) to show the user of the user device how the patient dynamics are changed when certain inclusion and/or exclusion requirement(s) are changed. Thus, and in some embodiments, the secure medical dashboard system may automatically and dynamically determine which inclusion and/or exclusion requirements should be changed to meet the trial providers' needs to identify applicable patients.

In some embodiments, and as shown in block 506, the process flow 500 may include the step of comparing the at least one patient attribute and the at least one inclusion requirement or the at least one exclusion requirement. By way of non-limiting example, the secure medical dashboard system may compare the patient attribute(s) for a patient to determine whether the patient attribute(s) should be used for an inclusion and/or exclusion requirement(s) and whether the patient attribute(s) meet the inclusion and/or exclusion requirement(s) (e.g., where an inclusion or exclusion requirement details the patient's age, the secure medical dashboard system may determine a mention of a human's age within the patient attributes should be compared against the inclusion or exclusion requirement).

By way of non-limiting example, the secure medical dashboard system may determine whether a patient attribute meets an inclusion or exclusion requirement by determining whether the patient attribute meets the inclusion requirement (e.g., matches the inclusion requirement, meets the requirement, and/or the like) or does not meet the exclusion requirement which is positively recited (e.g., the patient attribute is the opposite of the exclusion requirement when the exclusion requirement states the presence of an attribute (which indicates the patient attribute does not meet the exclusion requirement)). In some embodiments, and where the exclusion requirement is negatively recited (e.g., the exclusion requirements states that the patient should not comprise a particular attribute), then the presence of the attribute shows the exclusion requirement was not met. However, and where the exclusion requirement is negatively recited and the patient does not comprise the attribute (e.g., based on the exclusion requirement of a patient not being pregnant and where a patient's attributes do not comprise an attribute of pregnancy, then the exclusion requirement would not be met).

In some embodiments, and as shown in block 508, the process flow 500 may include the step of generating a provider identifier associated with the patient. By way of non-limiting example, the secure medical dashboard system may generate and/or identify the provider identifier associated with the patient by identifying the provider the patient has seen and received medical treatment from.

In some embodiments, the secure medical dashboard system may identify the patient identifier based on the unstructured dataset when the unstructured dataset comprises an identifier that uniquely identifies the provider (e.g., a hospital the patient visited and which may have appeared on a hospital visit record, a doctor's office the patient visited and which may have appeared on a doctor's record, and/or the like). In some embodiments, and where the unstructured dataset only comprises a name of the provider, the secure medical dashboard system may be configured to generate the provider identifier (a unique identifier of the provider, which may comprise a name, a sequence of numbers, a sequence of alphanumeric characters, and/or the like) based on the name and associate the data of the unstructured dataset with the provider identifier (and previously determined medical data for the provider identifier). Thus, and as described herein, the secure medical dashboard system may be configured to parse the data of the unstructured dataset, identify a provider identifier, and identify the medical data and medical modifier data for the provider from the unstructured dataset.

In some embodiments, and as shown in block 510, the process flow 500 may include the step of determining—based on the provider identifier—a plurality of patient attributes associated with a plurality of current patients, wherein the plurality of current patients is associated with a provider of the provider identifier. By way of non-limiting example, the secure medical dashboard system may determine a plurality of patient attributes by identifying the patient attributes associated with the patients of the provider identifier, where the plurality of patient attributes is associated with at least one patient of the provider (or a plurality of patients). For instance, the provider identifier may be used to identify the patients that have used the provider (e.g., patients of the hospital, patients of the doctor, patients of the physician assistant, patients of the hospital system, and/or the like) to identify all the patient attributes for all the patients.

In some embodiments, the patients identified that used the provider may be limited in time to a pre-determined period, such as only those patients within the past year, within the past two years, within the past three years, within the past four years, within the past five years, and/or the like. In some embodiments, the pre-determined period may be pre-determined by a client of the secure medical dashboard system (such as a trial provider, a provider, and/or the like). In some embodiments, the patients of the provider may comprise all the patients the provider has ever helped and/or seen, such that the secure medical dashboard system is configured to identify all the patient attributes for all the patients of a provider identifier, holistically.

In some embodiments, and as shown in block 512, the process flow 500 may include the step of receiving the at least one inclusion requirement or the at least one exclusion requirement, wherein the at least one inclusion requirement or the at least one exclusion requirement is associated with at least one patient attribute of the plurality of patient attributes. By way of non-limiting example, the secure medical dashboard system may receive and/or identify inclusion requirement(s) from a user device (such as a user device associated with a client of the secure medical dashboard system, like a trial provider client) which are used to determine whether a patient comprises a patient attribute that is inclusive for a particular trial. Thus, and by way of non-limiting example, the secure medical dashboard system may receive the inclusion requirement(s) from the user device once the user device has transmitted the selected inclusion requirement(s) from the user of the device. In some embodiments, the secure medical dashboard system may be additionally and/or alternatively configured to determine the inclusion requirements, such that the patients that fit the inclusion requirements are updated and/or increased.

Similarly, and in some embodiments, the secure medical dashboard system may be received and/or identify exclusion requirement(s) which are also used to determine whether patients comprise a patient attribute that excludes them from a particular trial. For instance, and where an exclusion requirement requires that the patient cannot be pregnant, then a patient attribute for a patient which comprises an indicator that the patient is pregnant, then the exclusion requirement may be met. Such an exclusion requirement may be received from a user device associated with a client of the secure medical dashboard system (such as a user device associated with the trial provider) and/or the secure medical dashboard system may determine its own updated exclusion requirements (including excluding exclusion requirements) in order to increase the patient pool for the trial.

In some embodiments, and as shown in block 514, the process flow 500 may include the step of generating, based on the plurality of patient attributes associated with the plurality of current patients, a provider index for the provider identifier. By way of non-limiting example, the secure medical dashboard system may generate a provider index for each of the patients and their associated patient attributes. For instance, such a provider index may comprise the patient attributes for the current patients currently seen and/or currently associated with the provider (e.g., seen within the pre-determined and/or associated with within the pre-determined period). In some embodiments, the provider index may additionally comprise the patient attributes for the patients historically seen and/or associated with the provider. For instance, such a provider index may comprise the data of all the patients associated with the provider (which may include all the patients for a doctor's office, all the patients for a hospital, all the patients for a PA, all the patients for all the hospitals within a hospital system, and/or the like) and their associated attributes. However, and in some instances, the provider index may not comprise patient identifying data, such that the provider index is a broad overview of all the patients associated with the provider, without the data which may be used to identify the patients, individually. In some other embodiments, the provider index may comprise patient identifying data, such that each patient may be individually identified from the provider index.

In some embodiments, the provider index may be organized in such a way that the inclusion and exclusion requirements are listed with respect to the number of patients of the provider that fit each requirement. Thus, and in some embodiments, the secure medical dashboard system may be configured to generate the provider index with which providers offer the greatest number of patients for each requirement and for all the requirements (meeting both the inclusion and the exclusion requirements and/or meeting only the inclusion requirement(s) and none of the exclusion requirement(s)).

In some embodiments, the provider index may comprise a dynamic patient total for the at least one inclusion requirement or the at least one exclusion requirement, whereby the dynamic patient total is based on the plurality of patient attributes compared to the at least one inclusion requirement or the at least one exclusion requirement. In some embodiments, the dynamic patient total may dynamically change based on the updated inclusion and/or updated exclusion requirements which are changed by the secure medical dashboard system.

In some embodiments, and as shown in block 516, the process flow 500 may include the step of generating the medical dashboard interface component comprising the at least one inclusion requirement or the at least one exclusion requirement, the provider identifier, and the provider index. By way of non-limiting example, the medical dashboard interface component may comprise the at least one inclusion requirement or the at least one exclusion requirement (or all the inclusion requirements and exclusion requirements as received or identified), the provider identifier (e.g., hospital identifier, hospital system identifier, doctor's office identifier, physician assistant identifier, doctor identifier, hospital system identifier, and/or the like), and the provider index as described herein. In some embodiments, the medical dashboard interface component may further comprise data of the provider, such as a region identifier where the provider is (e.g., what state, city, county, regional area within the country, and/or the like), and other such data that may described elsewhere herein.

In this manner, and with respect to this medical dashboard interface component, the medical dashboard interface component may be transmitted to a user device of a client of the secure medical dashboard system (such as a trial provider client of the secure medical dashboard system), a user device of a manager of the secure medical dashboard system (e.g., a user device within the secure medical dashboard system's network), a user device of a medical provider associated with the secure medical dashboard system, and/or the like. In this manner, the medical dashboard interface component may not comprise patient identifying data, such that the medical dashboard interface component is used to generate the secure medical dashboard on the user's device without violating patient confidentiality requirements.

In some embodiments, and as shown in block 518, the process flow 500 may include the step of generating a record identifier associated with the patient. By way of non-limiting example, the record identifier may be associated with a particular patient (e.g., by a patient identifier), such that the record identifier may be used to show all the patient attributes of the patient. In some embodiments, the record identifier may be identified in the unstructured dataset and used to determine the patient attributes based on the medical data and medical modifier data identified by the at least one NLP pipeline of the secure medical dashboard system. Thus, and in some embodiments, the secure medical dashboard system may determine the patient attributes associated with the record identifier by identifying the record identifier in the unstructured dataset, identifying the patient attributes based on the positive medical attributes and the medical modifier attributes, the medical entity titles, and combining the patient attributes for the record identifier in a single document and/or in a single patient index.

In some embodiments, and as shown in block 520, the process flow 500 may include the step of generating, based on the comparison of the at least one patient attribute, an applicability rating of the patient. By way of non-limiting example, the secure medical dashboard system may generate an applicability rating of the patient based on the inclusion requirement(s) and the exclusion requirement(s). In this manner, the applicability rating may be used to show how applicable the patient is for meeting the requirements of the trial for the client of the secure medical dashboard system, such as by meeting all the inclusion and exclusion requirements, meeting all the inclusion requirements and none of the exclusion requirements, and/or the like. In some embodiments, the applicability rating may comprise an applicability of the patient to meet each requirement individually and may comprise a binary identifier where a one may indicate a positive indicator that the requirement has been met and a zero may indicate a negative indicator that the requirement has not been met.

In some embodiments, and as shown in block 522, the process flow 500 may include the step of generating the medical dashboard interface component comprising the at least one term comprising the positive medical attribute, the record identifier, the applicability rating, the at least one patient attribute, and the at least one inclusion requirement or the at least one exclusion requirement. By way of non-limiting example, the secure medical dashboard system may generate the medical dashboard interface component comprising the terms of the unstructured dataset with the positive medical attribute (and in some embodiments, the terms of the medical modifier attributes), the record identifier for the unstructured dataset, the applicability rating(s), the at least one patient attribute as compared to the inclusion requirement(s) and/or exclusion requirement(s). In this manner, and with respect to this medical dashboard interface component, the medical dashboard interface component may be transmitted to a user device of a patient associated with the record identifier, a user device of a provider associated with the record identifier, and/or the like. In this manner, the medical dashboard interface component may comprise patient identifying data, such that the medical dashboard interface component is used to generate the secure medical dashboard on the user's device without violating patient confidentiality requirements.

FIG. 6 illustrates an exemplary graphical user interface comprising a secure medical dashboard, further comprising provider identifiers and associated provider data, in accordance with an embodiment of the disclosure. In some embodiments, a secure medical dashboard system (e.g., similar to one or more of the systems described herein with respect to FIGS. 1A-1C and FIG. 2) may perform one or more of the steps to generate the secure medical dashboard 600 of FIG. 6.

For example, the secure medical dashboard shown on a user device may comprise at least a list of provider identifiers in the form of a system number 601 (e.g., a hospital system number which may act as a hospital system identifier); a provider number 602 (e.g., a hospital number which may act as a hospital identifier), and/or the like. In some embodiments, and as shown in exemplary secure medical dashboard 600, the secure medical dashboard may comprise provider data such as but not limited to a geographic region of the provider 603 (e.g., a geographic region of the hospital such as "South Atlantic," "Pacific," "New England," "West South Central," "Mountain," "East South Atlantic," "Middle Atlantic," and/or the like); population density of the provider 604 (e.g., population density of the area in which the provider is located, such as identifying the location as "Urban" or "Rural"); teaching status of the provider 605 (e.g., "Teaching Hospital," or "Non-Teaching Hospital"); provider's current potential availability 606 (e.g., identifying the number of total beds within the hospital); and/or the like.

Further, and in some embodiments, the secure medical dashboard may comprise the current data of the patients of the provider, such as the current number of patients associated with the provider and/or current to the provider 607 (which may comprise the patients seen in the pre-determined period and/or patients currently located at the provider). Additionally, and of the patient data current to the provider, the secure medical dashboard may comprise each of the inclusion requirements (608, 609, 610) and/or exclusion requirements (611, 612, 613, 614) received from a client of the secure medical dashboard system (e.g., a trial provider) and generate the number of patients that fit each inclusion and/or exclusion requirement, individually (inclusion requirement_1 and its patient total 608, inclusion requirement_2 and its patient total 609, inclusion requirement_3 and its patient total 610, exclusion requirement_1 611, exclusion requirement_2 612, exclusion requirement_3 613, exclusion requirement_4 614, and/or the like) and/or on a holistic scale (i.e., one number of patients fit all requirements). Further, and in some embodiments, the secure medical dashboard may comprise a dynamic patient total which may change based on the secure medical dashboard system's automatic configuration of the inclusion and/or exclusion requirements, whereby the dynamic patient total comprises a holistic value of the number of patients that fit the updated/changed inclusion and/or exclusion requirements.

FIG. 7 illustrates an exemplary secure medical dashboard on a GUI of a user device, further comprising potential inclusion and exclusion requirements, in accordance with an embodiment of the disclosure. In some embodiments, a secure medical dashboard system (e.g., similar to one or more of the systems described herein with respect to FIGS.

1A-1C and FIG. 2) may perform one or more of the steps to generate the secure medical dashboard 700 of FIG. 7.

In some embodiments, the secure medical dashboard may comprise its own window and/or tab showing the inclusion and/or exclusion requirements, individually and how each inclusion and/or exclusion requirement is associated with patients on an overall scale (holistic value) across different providers. For instance, and as shown in secure medical dashboard 700, each inclusion requirement (e.g., patient inclusion set 708 which comprises data of how many patients fit at least one of the inclusion requirements ("Any Criteria Met" 722 and its breakdown of overall patients). Further, the secure medical dashboard may comprise a breakdown of each inclusion requirement 708 and its patient data, individually, such as that shown as the overall patient data for when the patient was last seen by the provider (e.g., patient last seen 711 within the past year and the number of patients, within the past 1-2 years and a number of patients, within the past 3-5 years and a number of patients, over 5 years before and the number of patients, which may be used for the patient date data), the overall patient data for the total number of inclusion requirements met 712, the total number of patients that met the inclusion requirement of being over a certain age 713, the total number of patients meeting the inclusion requirement of patients with an open wound 714, the total number of patients meeting the inclusion requirement of patients with a lower extremity wound condition, and/or the like.

Further, and in some embodiments, the secure medical dashboard may comprise its own window and/or tab shown the exclusion requirements, individually and holistically, across different providers. For instance, and as shown in block 709, the secure medical dashboard may show the breakdown of the number of patients that meet at least one of the exclusion requirements 723, and/or show the breakdown of each of the total number of patients that meet each exclusion requirement, individually (e.g., 716, 717, 718, 719, 720, 721). Thus, and in some embodiments, the secure medical dashboard 700 may show each total patient number across different providers for each exclusion requirement, such as the total number of patients that are pregnant 716, the total number of patients that have an infection in the wound 717, the total number of patients that have a systemic infection 718, the total number of patients with a pre-existing condition 719, the total number of patients that received hyperbaric oxygen therapy 720, and the total number of patients that are subject to a coagulation disorder 721.

Additionally, and in some embodiments, the secure medical dashboard may comprise a separate exclusion requirement (e.g., that shown as wound exclusion set 729, as an example), which may—depending on the exclusion requirement received—be an automatic prevention of the patient that meets the separate exclusion requirement from participating in the trial. For instance, and where a patient has received another type of wound therapy (such as the patients shown in 730), but the patient has not met any of the other exclusion requirements of 709 (716, 717, 718, 719, 720, 721), the patient may be automatically excluded based on the separate exclusion requirement 730.

In some embodiments, the secure medical dashboard may additionally comprise a breakdown of providers and their associated current patients, such as that shown in block 731 which comprises a summary of providers 732, the hospital systems and their associated patient total 733, the individual hospitals and their associated patient total 734, the attending physicians and their associated patient total 735, the departments that the attending physicians belong to and their associated patient total 736, and/or the like. In some embodiments, the hospital system networks 731 and its associated data (shown in 732, 733, 734, 735, 736, and/or the like) may be shown in the exemplary secure medical dashboard 700 shown herein and/or in a similar secure medical dashboard like that shown and described elsewhere herein.

FIG. 8 illustrates an exemplary secure medical dashboard on a GUI of a user device, further comprising patient attributes, provider attributes from a provider index, and a geographic graphic, in accordance with an embodiment of the disclosure. In some embodiments, a secure medical dashboard system (e.g., similar to one or more of the systems described herein with respect to FIGS. 1A-1C and FIG. 2) may perform one or more of the steps to generate the secure medical dashboard 800 of FIG. 8.

For instance and as shown in secure medical dashboard 800, the secure medical dashboard system may be configured to show the geographic breakdown of each of the providers (e.g., hospitals), such as through a geographic map (e.g., shown as Hospital Summary Map 801), through pie charts, through donut charts (e.g., donut charts 802, 803, 804, and 804), and/or the like. Further, and as shown in exemplary secure medical dashboard 800, the provider data may be shown through a graphic, such as through a donut chart (e.g., donut charts 802, 803, 804, and 804), through a bar graph, through a map, through a table, and/or the like.

As shown in secure medical dashboard 800, the secure medical dashboard may comprise a breakdown of the provider data through a graphic, including the breakdown of the provider's population density (802), the provider's current potential availability (803), the provider's geographic location (Division donut chart 804), the provider's teaching status (805), and/or the like. As described herein and as understood by a person of skill in the art, the secure medical dashboard 800 may comprise graphics of any of the data disclosed herein.

FIG. 9 illustrates an exemplary secure medical dashboard on a GUI of a user device, further comprising patient attributes in an exemplary bar graph, in accordance with an embodiment of the disclosure. In some embodiments, a secure medical dashboard system (e.g., similar to one or more of the systems described herein with respect to FIGS. 1A-1C and FIG. 2) may perform one or more of the steps to generate the secure medical dashboard 900 of FIG. 9.

In some embodiments, and as shown in exemplary secure medical dashboard 900, the secure medical dashboard may further comprise graphics (such as a bar chart like that shown in bar chart 901) of the patient follow-up data. For instance, the secure medical dashboard system may be configured to show the follow-up data for patients for each provider, such that the client of the secure medical dashboard system and/or user of the secure medical dashboard system can easily determine the kind of care a patient of the provider may receive and how often such care may occur (including after a patient's first and/most recent visit to the provider). In some embodiments, and as shown in exemplary secure medical dashboard 900, the follow-up patient data may comprise data regarding the provider's patients and how many patients of the provider have visited the provider within 30 days after receiving care 902, how many patients of the provider that visited within 90 days after receiving care 903, how many patients of the provider visited an emergency room or department within 30 days after receiving care 904, how many patients of the provider visited an emergency room or department within 90 days after receiving care 905, how many patients of the provider had impatient care within 30 days after receiving care 906, how many patients of the provider received impatient care within 90 days after receiving care 907, how many patients of the provider received outpatient care within 30 days after receiving care 908, how many patients of the provider received outpatient care within 90 days after receiving care 909, and/or the like.

Such data regarding patient follow-up for each provider may be used by a client of the secure medical dashboard system to determine whether a provider should be selected for a trial, as a higher percentage of patients receiving care between 0-90 days after the initial care was given may indicate that a provider has a high morbidity rate, has a high infection rate, has a high rate of complications, and/or the like.

Further, and in some embodiments, the secure medical dashboard may comprise a visual and/or graphic indicating the patient data for each provider, including a patient's morbidity data. For instance, and with respect to the "patient end points" data 910 on the secure medical dashboard 900, the secure medical dashboard may indicate how many of the patients of the provider that have died were ever in an intensive care unit (ICU) 911, and how many of the patients that were in the ICU, the data regarding the provider's patients ICU visits 912 (e.g., Number of cases, mean of the days of ICU visits, standard deviation of ICU days, median of ICU days, percentiles of ICU days, and/or the like), the total cost of ICU visits for patients of the provider 913 (including, but not limited to, the total number of patient cases who have died, the mean of cost for patients who have died, the standard deviation of costs of patients who died, the median cost of patients who died, the percentiles of cost for patients who died, and/or the like), and/or the like.

Further, and in some embodiments, the secure medical dashboard may comprise a visual and/or graphic indicating the discharge status (e.g., Discharge Status 914 on exemplary secure medical dashboard 900), which may indicate data of the patients that expired (died) in the provider's care, were discharged to home, were discharged to hospice, were discharged to a long term care facility, were transferred to another provider/hospital, and/or the like.

FIG. 10 illustrates an exemplary secure medical dashboard interface on a GUI of a user device, further comprising patent attributes in exemplary bar graphs and donut charts, in accordance with an embodiment of the disclosure. In some embodiments, a secure medical dashboard system (e.g., similar to one or more of the systems described herein with respect to FIGS. 1A-1C and FIG. 2) may perform one or more of the steps to generate the secure medical dashboard 1000 of FIG. 10.

In some embodiments and as shown in exemplary secure medical dashboard 1000, the secure medical dashboard system may be configured to generate the secure medical dashboard with graphics (e.g., donut charts, pie charts, bar graphs, and/or the like) to show the data for each patient as associated with each provider 1001 (e.g., the patient demographic data for each provider and/or for all the providers analyzed). For instance, and as shown in bar graph 1002, the patient ages may be shown as different bars within the bar chart, in order to show the overall demographic makeup of the patients for each provider and/or for all the providers analyzed. Similarly, and with respect to gender, the secure medical dashboard 1000 may comprise a gender chart 1003 (e.g., a donut chart) showing the overall makeup of the patients with respect to their genders for each provider and/or for all the providers. An ethnicity graphic 1004 may additionally be rendered on the secure medical dashboard to show the makeup of the patients with respect to their ethnicity for each provider and/or for all the providers. In some embodiments, the secure medical dashboard 1000 may additionally render a race graphic 1005 which renders and/or shows the makeup of the patients with respect to their races for each provider and/or for all the providers.

In some embodiments, the secure medical dashboard 1000 may also comprise a rendering a payor type graphic 1007 indicating the makeup of who is most likely to pay for the provider with respect to each provider and/or for all the providers for the patient care received. Similarly, the secure medical dashboard 1000 may also comprise a rendering, such as a point of origin graphic 1008 indicating the makeup of where a patient for a provider is likely to receive patient care first (point of origin for the patient care) and what kind of provider it will be (e.g., clinic, non-healthcare setting, unknown, transferred from another hospital/provider, transferred from a long-term care facility, and/or the like). Additionally, the secure medical dashboard 1000 may further comprise a graphic to render the admit type of the patients 1009, which may comprise the data of what kind of care brought the patient to the provider (e.g., elective, emergent/emergency, unknown/other, trauma, urgent, and/or the like).

In some embodiments, the secure medical dashboard 1000 may comprise a rendering showing the inpatient outpatient data 1010 within a graphic (e.g., donut chart) of how many patients are often seen by a provider (or all the providers analyzed) are inpatient versus outpatient.

In some embodiments, the secure medical dashboard 1000 may comprise a rendering showing the discharge status of the patients for a provider and/or for the providers considered, which may comprise data in a bar chart like that shown exemplarily for bar chart Discharge Status 1011. Such a discharge status bar chart may comprise data of the patients that expired (died in the care of the provider), were discharged to home, were discharged to hospice, were discharged to a long term care facility, were transferred to another provider/hospital, and/or the like.

FIG. 11 illustrates an exemplary secure medical dashboard interface on a GUI of a user device, further comprising patent attributes in an exemplary bar graph and an index of patient attributes as related to geographic identifiers, in accordance with an embodiment of the disclosure. In some embodiments, a secure medical dashboard system (e.g., similar to one or more of the systems described herein with respect to FIGS. 1A-1C and FIG. 2) may perform one or more of the steps to generate the secure medical dashboard 1100 of FIG. 11.

In some embodiments, the secure medical dashboard system may generate the secure medical dashboard to be similar to exemplary secure medical dashboard 1100, which comprises and renders the patient comorbidity index 1101 for patients for a particular provider. For instance, and as shown herein, the comorbidity index 1101 may show the comorbidity of patients with respect to what kind of disease, sickness, diagnosis, and/or the like that caused a patient's death and the percentage of patients' deaths for each (e.g., Aids, Dementia, diabetes, renal disease, ulcer, tumor, and/or the like).

Additionally, and in some embodiments, the secure medical dashboard may comprise and/or render the data as associated with a comorbidity index (e.g., Charlson Comorbidity index (CCI) class 1120), the custom table 1121 which may be rendered for particular data regarding providers and the patients they see and the particular diseases, symptoms, diagnoses, and/or the like. In some embodiments, and as shown in secure medical dashboard 1100, the custom table

1121 may comprise data regarding particular patient diagnoses like particular wounds (e.g., Dehisced wound 1122, diabetic foot ulcer 1123, mixture of wounds 1124, and/or the like), along with the data of where the patients were at the time of the diagnosis (e.g., the geographic region/division) and how many patients of the total patients in that geographic region had each diagnosis.

FIG. 12 illustrates an exemplary secure medical dashboard interface on a GUI of a user device, further comprising record identifiers for a patient and patient attributes, in accordance with an embodiment of the disclosure. In some embodiments, a secure medical dashboard system (e.g., similar to one or more of the systems described herein with respect to FIGS. 1A-1C and FIG. 2) may perform one or more of the steps to generate the secure medical dashboard 1200 of FIG. 12.

In some embodiments, and as shown in exemplary secure medical dashboard 1200, data of patient clinic trials may be rendered. For instance, and in tab 1201 of the secure medical dashboard 1200, may render the clinical trial patient list 1201, the inclusion/exclusion requirements 1202, the patient demographic data 1203, the patient summary data 1204, and/or the like. Similarly, and as shown in secure medical dashboard 1200, the secure medical dashboard may render each of these data packets on its own configured GUI by rendering each on its own designated website, tab, window, and/or the like.

In some embodiments, and as shown in the clinical trial patient list 1201, the secure medical dashboard may comprise data of the patients including the record identifiers 1207, the age of the patient 1208 for each record identifier, the race of each patient 1209 for each record identifier, the ethnicity of each patient 1210 for each record identifier, the timeline of when each patient was last seen by the provider 1212 for each record identifier, and the applicability rating 1213 for each patient of the record identifiers, and/or the like. Similarly and as described above, the secure medical dashboard may additionally show each inclusion and/or exclusion requirement (e.g., inclusion 1 (1214), inclusion 3 (1215), inclusion 5 (1216), patient exclusion 1 (1217), patient exclusion 2 (1218), patient exclusion 3 (1219), patient exclusion 4 (1220), patient exclusion 5 (1221), patient exclusion 6 (1222), wound exclusion 4 (1223)) within indicators indicating whether each inclusion or exclusion requirement has been met by each patient. As exemplarily shown, the secure medical dashboard may comprise an indicator such as a graphic (e.g., a green dot indicates the requirement was met and a yellow or red dot indicates the requirement was not met), a binary value (e.g., 1 indicates the requirement was met and zero indicates the requirement was not met), and/or the like. Such a secure medical dashboard, like that shown as secure medical dashboard 1200 may be based on a medical dashboard interface component transmitted to a user device, such as a patient user device (e.g., where only patient data for that receiving patient is shown), a hospital/provider user device (e.g., the hospital/provider that has seen only the patients for which the patient data is rendered), and/or the like.

As used herein, and as understood by a person of ordinary skill in the art, when the secure medical dashboard system is generating the secure medical dashboard, it is generating the medical dashboard interface component with the proper associated data (e.g., the data shown and described on the secure medical dashboard) including any graphics, dynamic changes to the inclusion or exclusion requirements, and/or the like, and transmitting such data in a data packet to the proper user device for configuration of the GUI of the user device.

FIG. 13 illustrates an exemplary secure medical dashboard on a GUI of a user device, further comprising medical entity titles, medical modifier attributes and terms, and UMLS identifiers, in accordance with an embodiment of the disclosure. In some embodiments, a secure medical dashboard system (e.g., similar to one or more of the systems described herein with respect to FIGS. 1A-1C and FIG. 2) may perform one or more of the steps to generate the secure medical dashboard 1300 of FIG. 13.

In some embodiments, and as shown in exemplary secure medical dashboard 1300, the secure medical dashboard may be rendered on a user device associated with a manager of the secure medical dashboard system. For instance, and as shown in the results dataframe chart (e.g., as shown in exemplary secure medical dashboard 1300), the secure medical dashboard may render the data of the at least one NLP pipeline as it makes its predictions for the terms in the unstructured datasets. For example, the NLP pipeline may determine the predicted medical entity title (e.g., test_name 1301), the type of medical modifier attribute (e.g., Negation 1302 indicating the presence of whether a term comprising the medical modifier attribute comprises a negative or positive description of the medical entity title), the term associated with the medical modifier attribute (e.g., Test_Result 1303 which may comprise terms such as "there is no," "obscure," "suggestive," "no," "appears calcified," and/or the like), and/or the like. Similarity, and as shown in exemplary secure medical dashboard 1300, the secure medical dashboard may comprise the correlated UMLS identifiers (e.g., UMLS_Concept_ID 1304) for each predicted medical entity title, the predicted semantic labels of the terms for the unstructured dataset (UMLS_Child_Semantic_Label 1305) which may indicate the semantic label within the UMLS for the UMLS identifier of the medical entity title (e.g., disease, syndrome, body location or region, body part, sign or symptom, and/or the like), and the predicted parent labels of the terms for the unstructured dataset (UMLS_Parent_Semantic_Label 1306) indicating the parent label for the UMLS identifier of the medical entity title.

In this manner, the secure medical dashboard—through the use of the at least one NLP pipeline—may be configured to generate and organize the terms of the unstructured dataset with the associated medical relevance attributes, the medical entity titles, and the correlated UMLS identifiers and data to create the structured dataset used in generating the secure medical dashboard.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable program-mable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural program-ming languages, such as the "C" programming languages and/or similar programming languages. The computer pro-gram code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illus-trations and/or block diagrams, and combinations of blocks included in the flowchart illustrations and/or block dia-grams, may be implemented by one or more computer-executable program code portions. These computer-execut-able program code portions execute via the processor of the computer and/or other programmable data processing appa-ratus and create mechanisms for implementing the steps and/or functions represented by the flowchart(s) and/or block diagram block(s).

It will also be understood that the one or more computer-executable program code portions may be stored in a tran-sitory or non-transitory computer-readable medium (e.g., a memory, and the like) that can direct a computer and/or other programmable data processing apparatus to function in a particular manner, such that the computer-executable pro-gram code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable appa-ratus provide operational steps to implement the steps speci-fied in the flowchart(s) and/or the functions specified in the block diagram block(s). Alternatively, computer-imple-mented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and sub-stitutions, in addition to those set forth in the above para-graphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for generating a secure medical dashboard using natural language processing (NLP), the system com-prising:

at least one non-transitory storage device;

at least one processor coupled to the at least one non-transitory storage device, wherein the processing device is configured to execute computer program code comprising computer instructions configured to cause said at least one processor to perform the following operations:

identify at least one data input, wherein the at least one data input comprises unstructured data;

apply at least one trained NLP pipeline to the at least one data input, wherein the at least one trained NLP pipeline is trained using the following operations:

identifying at least one previous unstructured data-set, wherein the at least one previous unstructured dataset comprises an at least one previous term;

applying the at least one NLP pipeline to the at least one previous unstructured dataset;

determining, by the at least one NLP pipeline, the medical relevance attribute for the at least one previous term;

mapping, by the at least one NLP pipeline, the at least one previous term comprising the positive medical attribute to the medical entity title;

comparing the medical entity title for the at least one previous term to a pre-labeled medical entity title for the at least one previous term;

comparing the positive medical attribute for the at least one previous term to a pre-labeled medical relevance attribute;

determining whether to adjust at least one weight associated with the at least one NLP pipeline based on the comparison of the medical entity title to the pre-labeled medical entity title and the comparison of the positive medical attribute to the pre-labeled medical relevance attribute, adjust, in an instance where at least one of the medical entity title does not match the pre-labeled medical entity title or the medical attri-bute does not match the pre-labeled medical relevance attribute, the at least one weight of the at least one NLP pipeline, or maintain, in an instance where the medical entity title matches the pre-labeled medical entity title and the medical attribute matches the pre-labeled medical relevance attribute, the at least one weight of the at least one NLP pipeline;

training, in response to the determination of whether to adjust the at least one weight, the at least one NLP pipeline based on the at least one weight of the at least one NLP pipeline;

parse, by the at least one trained NLP pipeline, the unstructured data of the at least one data input to generate a parsed unstructured dataset, wherein the parsed unstructured dataset comprises a plurality of terms;

identify, by the at least one trained NLP pipeline, a medical relevance attribute for each term within the unstructured dataset, wherein the medical relevance attribute comprises at least one of a positive medical attribute, a medical modifier attribute, or a negative medical attribute;

generate, based on the medical relevance attribute for each term, a structured document comprising each term and associated medical relevance attribute comprising the positive medical attribute or the medical modifier attribute;

correlate, by the at least one trained NLP pipeline, each term comprising the positive medical attribute to a medical entity title;

generate a medical dashboard interface component comprising each term comprising the positive medical attribute and the medical entity title;

transmit the medical dashboard interface component to a user device to configure a graphical user interface of the user device; and generate, based on the medical dashboard interface component, a secure medical dashboard on the user device.

2. The system of claim 1, wherein the pre-labeled medical entity title for the at least one previous term comprises at least one of an expert label or a proficient label.

3. The system of claim 1, wherein the at least one data input comprises identified data or de-identified data.

4. The system of claim 1, wherein the at least one data input comprises a plurality of data inputs from a plurality of data sources.

5. The system of claim 1, wherein the system further comprises:

identify at least one patient attribute based on the at least one data input, wherein the at least one patient attribute is associated with a patient;

receive an at least one inclusion requirement or at least one exclusion requirement, wherein the at least one inclusion requirement or the at least one exclusion requirement is associated with the at least one patient attribute; and compare the at least one patient attribute and the at least one inclusion requirement or the at least one exclusion requirement.

6. The system of claim 5, wherein the at least one patient attribute comprises at least one of the medical entity title, a patient biological attribute, or a patient date.

7. The system of claim 5, wherein the system further comprises:

generate a record identifier associated with the patient;

generate, based on the comparison of the at least one patient attribute, an applicability rating of the patient; and generate the medical dashboard interface component comprising the at least one term comprising the positive medical attribute, the record identifier, the applicability rating, the at least one patient attribute, and the at least one inclusion requirement or the at least one exclusion requirement.

8. The system of claim 5, wherein the system further comprises:

generate a provider identifier associated with the patient;

determine, based on the provider identifier, a plurality of patient attributes associated with a plurality of current patients, wherein the plurality of current patients are associated with a provider of the provider identifier;

receive the at least one inclusion requirement or the at least one exclusion requirement, wherein the at least one inclusion requirement or the at least one exclusion requirement is associated with at least one patient attribute of the plurality of patient attributes;

generate, based on the plurality of patient attributes associated with the plurality of current patients, a provider index for the provider identifier; and generate the medical dashboard interface component comprising the at least one inclusion requirement or the at least one exclusion requirement, the provider identifier, and the provider index.

9. The system of claim 8, wherein the provider index comprises a dynamic patient total for the at least one inclusion requirement or the at least one exclusion requirement, wherein the dynamic patient total is based on the plurality of patient attributes compared to the at least one inclusion requirement or the at least one exclusion requirement.

10. The system of claim 1, wherein the system further comprises:

determine a user identifier or an entity identifier associated with the user device; and dynamically generate, based on the user identifier or the entity identifier, the medical dashboard interface component, wherein, in an instance the entity identifier is a trial provider entity, generate the medical dashboard interface component comprising at least one inclusion requirement, at least one exclusion requirement, a patient total, a medical provider identifier, or an applicability rating of one or more patients or one or more medical provider identifiers, wherein, in an instance the user identifier is a patient identifier, generate the medical dashboard interface component comprising patient identifying data associated with the patient identifier or a record identifier, or wherein, in an instance the entity identifier is a medical provider, generate the medical dashboard interface component comprising the record identifier for one or more patients associated with the medical provider and patient identifying data for the one or more patients.

11. A computer program product for generating a secure medical dashboard using natural language processing (NLP), wherein the computer program product comprises at least one non-transitory computer-readable medium having computer-readable program code portions embodied therein, the computer-readable program code portions which when executed by a processing device are configured to cause the processor to:

identify at least one data input, wherein the at least one data input comprises unstructured data;

apply at least one trained NLP pipeline to the at least one data input, wherein the at least one trained NLP pipeline is trained using the following operations:

identifying at least one previous unstructured dataset, wherein the at least one previous unstructured dataset comprises an at least one previous term;

applying the at least one NLP pipeline to the at least one previous unstructured dataset;

determining, by the at least one NLP pipeline, the medical relevance attribute for the at least one previous term;

mapping, by the at least one NLP pipeline, the at least one previous term comprising the positive medical attribute to the medical entity title;

comparing the medical entity title for the at least one previous term to a pre-labeled medical entity title for the at least one previous term;

comparing the positive medical attribute for the at least one previous term to a pre-labeled medical relevance attribute;

determining whether to adjust at least one weight associated with the at least one NLP pipeline based on the comparison of the medical entity title to the pre-labeled medical entity title and the comparison of the positive medical attribute to the pre-labeled medical relevance attribute, adjust, in an instance where at least one of the medical entity title does not match the pre-labeled medical entity title or the medical attribute does not match the pre-labeled medical relevance attribute, the at least one weight of the at least one NLP pipeline, or maintain, in an instance where the medical entity title matches the pre-labeled medical entity title and the medical attribute matches the pre-labeled medical relevance attribute, the at least one weight of the at least one NLP pipeline;

training, in response to the determination of whether to adjust the at least one weight, the at least one NLP pipeline based on the at least one weight of the at least one NLP pipeline;

parse, by the at least one trained NLP pipeline, the unstructured data of the at least one data input to generate a parsed unstructured dataset, wherein the parsed unstructured dataset comprises a plurality of terms;

identify, by the at least one trained NLP pipeline, a medical relevance attribute for each term within the unstructured dataset, wherein the medical relevance attribute comprises at least one of a positive medical attribute, a medical modifier attribute, or a negative medical attribute;

generate, based on the medical relevance attribute for each term, a structured document comprising each term and associated medical relevance attribute comprising the positive medical attribute or the medical modifier attribute;

correlate, by the at least one trained NLP pipeline, each term comprising the positive medical attribute to a medical entity title;

generate a medical dashboard interface component comprising each term comprising the positive medical attribute and the medical entity title;

transmit the medical dashboard interface component to a user device to configure a graphical user interface of the user device; and generate, based on the medical dashboard interface component, a secure medical dashboard on the user device.

12. The computer program product of claim 11, wherein the processing device is configured to cause the processor to:

identify at least one patient attribute based on the at least one data input, wherein the at least one patient attribute is associated with a patient;

receive an at least one inclusion requirement or an at least one exclusion requirement, wherein the at least one inclusion requirement or the at least one exclusion requirement is associated with the at least one patient attribute; and compare the at least one patient attribute and the at least one inclusion requirement or the at least one exclusion requirement.

13. The computer program product of claim 12, wherein the processing device is configured to cause the processor to:

generate a record identifier associated with the patient;

generate, based on the comparison of the at least one patient attribute, an applicability rating of the patient; and generate the medical dashboard interface component comprising the at least one term comprising the positive medical attribute, the record identifier, the applicability rating, the at least one patient attribute, and the at least one inclusion requirement or the at least one exclusion requirement.

14. The computer program product of claim 12, wherein the processing device is configured to cause the processor to:

generate a provider identifier associated with the patient;

determine, based on the provider identifier, a plurality of patient attributes associated with a plurality of current patients, wherein the plurality of current patients are associated with a provider of the provider identifier;

receive an at least one inclusion requirement or an at least one exclusion requirement, wherein the at least one inclusion requirement or the at least one exclusion requirement is associated with at least one patient attribute of the plurality of patient attributes;

generate, based on the plurality of patient attributes associated with the plurality of current patients, a provider index for the provider identifier; and generate the medical dashboard interface component comprising the at least one inclusion requirement or the at least one exclusion requirement, the provider identifier, and the provider index.

15. A computer-implemented method for generating a secure medical dashboard using natural language processing (NLP), the computer-implemented method comprising:

identifying at least one data input, wherein the at least one data input comprises unstructured data;

applying at least one trained NLP pipeline to the at least one data input, wherein the at least one trained NLP pipeline is trained using the following operations:

identifying at least one previous unstructured dataset, wherein the at least one previous unstructured dataset comprises an at least one previous term;

applying the at least one NLP pipeline to the at least one previous unstructured dataset;

determining, by the at least one NLP pipeline, the medical relevance attribute for the at least one previous term;

mapping, by the at least one NLP pipeline, the at least one previous term comprising the positive medical attribute to the medical entity title;

comparing the medical entity title for the at least one previous term to a pre-labeled medical entity title for the at least one previous term;

comparing the positive medical attribute for the at least one previous term to a pre-labeled medical relevance attribute;

determining whether to adjust at least one weight associated with the at least one NLP pipeline based on the comparison of the medical entity title to the pre-labeled medical entity title and the comparison of the positive medical attribute to the pre-labeled medical relevance attribute, adjust, in an instance where at least one of the medical entity title does not match the pre-labeled medical entity title or the medical attribute does not match the pre-labeled medical relevance attribute, the at least one weight of the at least one NLP pipeline, or maintain, in an instance where the medical entity title matches the pre-labeled medical entity title and the medical attribute matches the pre-labeled medical relevance attribute, the at least one weight of the at least one NLP pipeline:

training, in response to the determination of whether to adjust the at least one weight, the at least one NLP pipeline based on the at least one weight of the at least one NLP pipeline;

parsing, by the at least one trained NLP pipeline, the unstructured data of the at least one data input to generate a parsed unstructured dataset, wherein the parsed unstructured dataset comprises a plurality of terms;

identifying, by the at least one trained NLP pipeline, a medical relevance attribute for each term within the unstructured dataset, wherein the medical relevance attribute comprises at least one of a positive medical attribute, a medical modifier attribute, or a negative medical attribute;

generating, based on the medical relevance attribute for each term, a structured document comprising each term and associated medical relevance attribute comprising the positive medical attribute or the medical modifier attribute;

correlating, by the at least one trained NLP pipeline, each term comprising the positive medical attribute to a medical entity title;

generating a medical dashboard interface component comprising each term comprising the positive medical attribute and the medical entity title;

transmitting the medical dashboard interface component to a user device to configure a graphical user interface of the user device; and generating, based on the medical dashboard interface component, a secure medical dashboard on the user device.

16. The computer-implemented method of claim 15, further comprising:

identifying at least one patient attribute based on the at least one data input, wherein the at least one patient attribute is associated with a patient;

receiving an at least one inclusion requirement or an at least one exclusion requirement, wherein the at least one inclusion requirement or the at least one exclusion requirement is associated with the at least one patient attribute; and comparing the at least one patient attribute and the at least one inclusion requirement or the at least one exclusion requirement.

17. The computer-implemented method of claim 16, further comprising:

generating a provider identifier associated with the patient;

determining, based on the provider identifier, a plurality of patient attributes associated with a plurality of current patients, wherein the plurality of current patients are associated with a provider of the provider identifier;

receiving an at least one inclusion requirement or an at least one exclusion requirement, wherein the at least one inclusion requirement or the at least one exclusion requirement is associated with at least one patient attribute of the plurality of patient attributes;

generating, based on the plurality of patient attributes associated with the plurality of current patients, a provider index for the provider identifier; and generating the medical dashboard interface component comprising the at least one inclusion requirement or the at least one exclusion requirement, the provider identifier, and the provider index.

* * * * *